US011601620B2

United States Patent
Nathan et al.

(10) Patent No.: US 11,601,620 B2
(45) Date of Patent: *Mar. 7, 2023

(54) CLOUD-BASED SEGREGATED VIDEO STORAGE AND RETRIEVAL FOR IMPROVED NETWORK SCALABILITY AND THROUGHPUT

(71) Applicant: IntelliVision Technologies Corp., San Jose, CA (US)

(72) Inventors: Vaidhi Nathan, San Jose, CA (US); Krishna Khadloya, San Jose, CA (US); Prakash Narayan, Fremont, CA (US); Albert Kay, San Mateo, CA (US)

(73) Assignee: IntelliVision Technologies Corp., San Jose, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/196,783

(22) Filed: Mar. 9, 2021

(65) Prior Publication Data

US 2021/0203887 A1 Jul. 1, 2021

Related U.S. Application Data

(63) Continuation of application No. 16/172,479, filed on Oct. 26, 2018, now Pat. No. 10,979,674, which is a (Continued)

(51) Int. Cl.
*H04N 7/18* (2006.01)
*G06N 3/08* (2023.01)
(Continued)

(52) U.S. Cl.
CPC ............... *H04N 7/181* (2013.01); *G06N 3/08* (2013.01); *G06V 20/10* (2022.01);
(Continued)

(58) Field of Classification Search
CPC ............. H04N 21/2662; H04N 21/235; H04N 21/252; H04N 21/6405; H04L 65/4076; H04L 12/1868
See application file for complete search history.

(56) References Cited

U.S. PATENT DOCUMENTS 6,803,945 B1 10/2004 Needham
9,553,757 B1 * 1/2017 Roth ........................ H04L 67/01
(Continued)

FOREIGN PATENT DOCUMENTS

CN 102014122 A 4/2011
CN 202095044 U 12/2011
(Continued)

OTHER PUBLICATIONS

"U.S. Appl. No. 14/337,962, Final Office Action dated Dec. 19, 2016", 22 pgs.
(Continued)

*Primary Examiner* — Jonathan R Messmore
(74) *Attorney, Agent, or Firm* — Schwegman Lundberg & Woessner, P.A.

(57) ABSTRACT

The invention is based, in part, on a system and method designed to be able to easily and automatically scale up to millions of cameras and users. To do this, this discourse teaches use of modern cloud computing technology, including automated service provisioning, automated virtual machine migration services, RESTful API, and various firewall traversing methods to facilitate the scaling process. Moreover, the system and method described herein teaches scalable cloud solutions providing for higher though-put camera provisioning and event recognition. The network may segregate the retrieval server from the storage server, and by doing so, minimizing the load on any one server and improving network efficiency and scalability.

20 Claims, 13 Drawing Sheets

Related U.S. Application Data continuation of application No. 15/463,516, filed on Mar. 20, 2017, now Pat. No. 10,142,381, which is a continuation-in-part of application No. 14/337,962, filed on Jul. 22, 2014, now abandoned.

(60) Provisional application No. 61/857,200, filed on Jul. 22, 2013, provisional application No. 61/857,200, filed on Jul. 22, 2013.

(51) Int. Cl.
*H04L 67/1036* (2022.01)
*H04L 67/1097* (2022.01)
*G06V 20/10* (2022.01)

(52) U.S. Cl.
CPC ...... *H04L 67/1036* (2013.01); *H04L 67/1097* (2013.01); *H04N 7/188* (2013.01)

(56) References Cited

U.S. PATENT DOCUMENTS

| | | | |
|---|---|---|---|
| 10,142,381 B2 * | 11/2018 | Nathan | H04L 67/1097 |
| 10,319,094 B1 * | 6/2019 | Chen | G06N 3/08 |
| 10,979,674 B2 | 4/2021 | Nathan et al. | |
| 2002/0056043 A1 | 5/2002 | Glass | |
| 2003/0222982 A1 | 12/2003 | Hamdan et al. | |
| 2004/0004191 A1 | 3/2004 | Naidoo et al. | |
| 2005/0268335 A1 | 12/2005 | Le et al. | |
| 2006/0045185 A1 | 3/2006 | Kiryati et al. | |
| 2007/0126869 A1 | 6/2007 | Montminy et al. | |
| 2008/0122920 A1 | 5/2008 | Chang | |
| 2008/0303903 A1 | 12/2008 | Bentley et al. | |
| 2010/0150409 A1 | 6/2010 | Ferguson | |
| 2010/0208986 A1 | 8/2010 | Cobb et al. | |
| 2011/0242317 A1 * | 10/2011 | Wengrovitz | H04N 7/181 348/E7.091 |
| 2012/0075469 A1 | 3/2012 | Oskin et al. | |
| 2012/0147184 A1 | 6/2012 | Siann et al. | |
| 2012/0281090 A1 | 11/2012 | Smith et al. | |
| 2012/0314018 A1 | 12/2012 | Wengrovitz et al. | |
| 2013/0258119 A1 | 10/2013 | Kim et al. | |
| 2015/0022666 A1 | 1/2015 | Kay et al. | |
| 2015/0138364 A1 * | 5/2015 | Enomoto | H04N 5/23206 348/151 |
| 2016/0005281 A1 * | 1/2016 | Laska | H04N 7/181 348/143 |
| 2016/0094814 A1 * | 3/2016 | Gousev | H04N 7/183 348/143 |
| 2017/0195386 A1 | 7/2017 | Nathan et al. | |
| 2020/0137354 A1 | 4/2020 | Nathan et al. | |

FOREIGN PATENT DOCUMENTS

| | | |
|---|---|---|
| CN | 105408944 A | 3/2016 |
| EP | 3025317 A1 | 6/2016 |
| EP | 3025317 B1 | 5/2019 |
| JP | 2004126864 A | 4/2004 |
| JP | 2005167523 A | 6/2005 |
| JP | 2006086940 A | 3/2006 |
| JP | 2006155028 A | 6/2006 |
| JP | 2006277518 A | 10/2006 |
| JP | 2008229272 A | 10/2008 |
| JP | 2009147927 A | 7/2009 |
| JP | 2011034181 A | 2/2011 |
| JP | 2012195698 A | 10/2012 |
| KR | 20020079266 A | 10/2002 |
| KR | 1020020079266 A | 10/2002 |
| WO | WO-2011121746 A1 | 10/2011 |
| WO | WO-2011155057 A1 | 12/2011 |
| WO | WO-2012142797 A1 | 10/2012 |
| WO | WO-2015013315 A1 | 1/2015 |

OTHER PUBLICATIONS

"U.S. Appl. No. 14/337,962, Non Final Office Action dated Jun. 3, 2016", 19 pgs.
"U.S. Appl. No. 14/337,962, Response filed Sep. 6, 2016 to Non Final Office Action dated Jun. 3, 2016", 14 pgs.
"U.S. Appl. No. 15/463,516, Examiner Interview Summary dated Apr. 18, 2018", 3 pgs.
"U.S. Appl. No. 15/463,516, Examiner Interview Summary dated Oct. 6, 2017", 3 pgs.
"U.S. Appl. No. 15/463,516, Final Office Action dated Dec. 28, 2017", 21 pgs.
"U.S. Appl. No. 15/463,516, Non Final Office Action dated Jul. 3, 2017", 17 pgs.
"U.S. Appl. No. 15/463,516, Notice of Allowance dated Jul. 19, 2018", 10 pgs.
"U.S. Appl. No. 15/463,516, Response filed Apr. 30, 2018 to Final Office Action dated Dec. 28, 2017", 19 pgs.
"U.S. Appl. No. 15/463,516, Response filed Oct. 2, 2017 to Non Final Office Action dated Jul. 3, 2017", 24 pgs.
"U.S. Appl. No. 16/172,479, Corrected Notice of Allowability dated Jan. 1, 2021", 2 pgs.
"U.S. Appl. No. 16/172,479, Corrected Notice of Allowability dated Jan. 28, 2021", 2 pgs.
"U.S. Appl. No. 16/172,479, Final Office Action dated Apr. 21, 2020", 22 pgs.
"U.S. Appl. No. 16/172,479, Non Final Office Action dated Jun. 26, 2020", 24 pgs.
"U.S. Appl. No. 16/172,479, Non Final Office Action dated Oct. 4, 2019", 23 pgs.
"U.S. Appl. No. 16/172,479, Notice of Allowance dated Dec. 9, 2020", 9 pgs.
"U.S. Appl. No. 16/172,479, Response filed Feb. 14, 2020 to Non Final Office Action dated Oct. 4, 2019", 24 pgs.
"U.S. Appl. No. 16/172,479, Response filed Jun. 2, 2020 to Final Office Action dated Apr. 21, 2020", 12 pgs.
"U.S. Appl. No. 16/172,479, Response filed Sep. 25, 2020 to Non Final Office Action dated Jun. 26, 2020", 13 pgs.
"Chinese Application Serial No. 201480041140.1, Decision of Rejection dated Dec. 29, 2018", W/0 English Translation, 11 pgs.
"Chinese Application Serial No. 201480041140.1, Office Action dated Jul. 11, 2018", w/English translation, 18 pgs.
"Chinese Application Serial No. 201480041140.1, Response filed Sep. 25, 2018 to Office Action dated Jul. 11, 2018", W/O English Translation, 20 pgs.
"European Application Serial No. 14829295.6, Communication Pursuant to Article 94(3) EPC dated Apr. 6, 2018", 11 pgs.
"European Application Serial No. 14829295.6, Extended European Search Report dated Feb. 13, 2017", 8 pgs.
"European Application Serial No. 14829295.6, Intention to Grant dated Dec. 17, 2018", 53 pgs.
"European Application Serial No. 14829295.6, Response filed Aug. 31, 2016 to Communication pursuant to Rules 161(1) and 162 EPC dated Mar. 1, 2016", 11 pgs.
"European Application Serial No. 14829295.6, Response filed Sep. 12, 2017 to Extended European Search Report dated Feb. 13, 2017", 14 pgs.
"European Application Serial No. 14829295.6, Response filed Oct. 5, 2018 to Communication Pursuant to Article 94(3) EPC dated Apr. 6, 2018", 15 pgs.
"International Application Serial No. PCT/US2014/047672, International Preliminary Report on Patentability dated Feb. 4, 2016", 9 pgs.
"International Application Serial No. PCT/US2014/047672, International Search Report dated Nov. 12, 2014", 2 pgs.
"International Application Serial No. PCT/US2014/047672, Written Opinion dated Nov. 12, 2014", 7 pgs.
"Japanese Application Serial No. 2016-529837, Appeal filed Aug. 14, 2019 to Decision of Rejection dated Apr. 16, 2019", w/ English claims, 19 pgs.
"Japanese Application Serial No. 2016-529837, Decision of Rejection dated Apr. 16, 2019", 7 pgs.

(56) References Cited

OTHER PUBLICATIONS

"Japanese Application Serial No. 2016-529837, Final Notification of Reasons for Refusal dated Sep. 24, 2020", w/ English translation, 18 pgs.

"Japanese Application Serial No. 2016-529837, Pre-Trial Examination Notification dated Nov. 26, 2019", w/ English translation, 10 pgs.

"Japanese Application Serial No. 2016-529837, Preliminary Examination Report dated May 7, 2020", 12 pgs.

"Japanese Application Serial No. 2016-529837, Response filed Jan. 10, 2020 to Pre-Trial Examination Notification dated Nov. 26, 2019", w/ current English claims, Claims not amended, translation not provided, 9 pgs.

"Japanese Application Serial No. 2016-529837, Response filed Aug. 6, 2020 to Preliminary Examination Report dated May 7, 2020", wZ English claims, 20 pgs.

Batt, et al., "Building Fault-Tolerant Applications on AWS", Amazon Web Services, (Oct. 2011).

Liu, et al., "Real-time Video Surveillance for Large Scenes", IEEE 2011, [Online] retrieved from the internet:<URL:http://ieeexplore.ieee.org/xpl/login.jsp?tp=&arnumber=6096963&url=http%3A%2F%2Fieeexplore.ieee.org%2Fxpls%2Fabs_all.jsp%3Farnumber%3D6096963>.

Verstraeten, et al., "Webcams for Bird Detection and Monitoring: A Demonstration Study", Sensors, 10, (2010), 3480-3503.

Wang, et al., "Cloud-based platform for embedded wireless video surveillance system", International Conference on Computational and Information Sciences, [Online] retrieved from the internet: <URL:http://ieeexplore.ieee.org/xpl/login.jsp?tp=&arnumber=6643271&url=http%3A%2F%2Fieeexplore.ieee.org%2Fxpls%2Fabs_all.jsp%3Farnumber%3D6643271>, (Jun. 23, 2013).

Zhang, et al., "Cloud computing: state-of-the-art and research challenges", J Internet Serv Appl (2010) 1, (2010), 7-18.

* cited by examiner

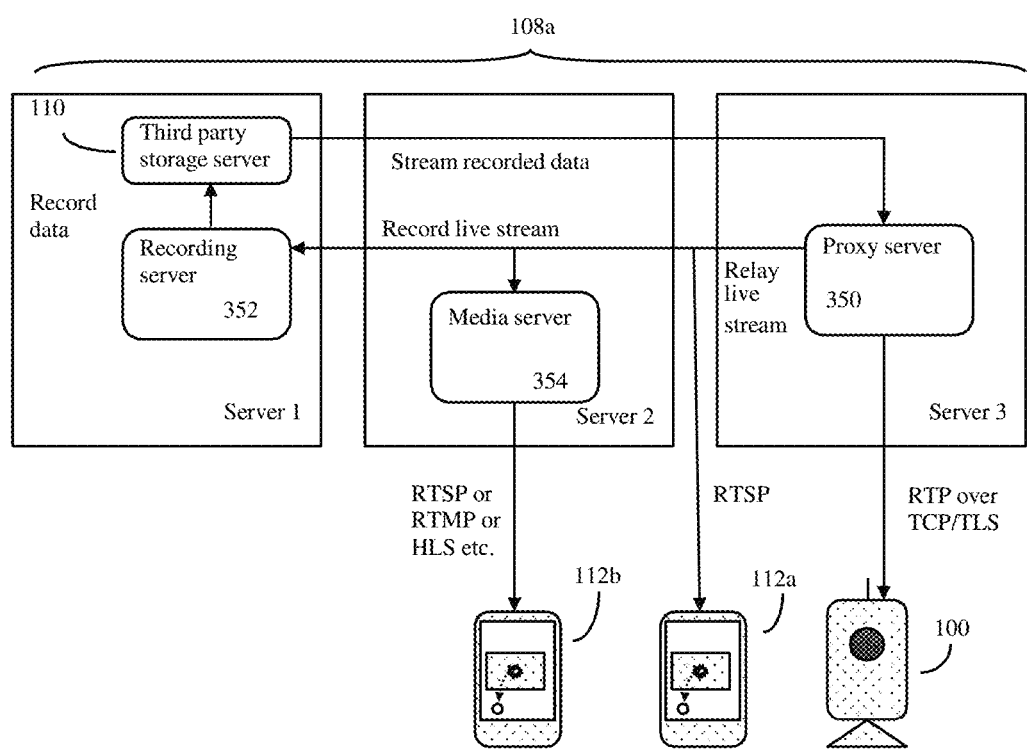

Fig. 11

Step 1 detecting a threshold-grade event from audio-video data of a real-world environment captured from a processor-controlled video camera by an event management system applying event detection parameters; 1110

Step 2 storing at least any one of a single stream of the recognized event in at least a first cloud-based server and retrieve the at least any one of the single stream from the at least first cloud-based server by at least one different retrieval dedicated cloud-based server; 1120

Step 3 facilitating at least one of a user defined playback of the retrieved single stream of the recognized event, user defined playback of the audio-video sequence succeeding and, or preceding the recognized event, and, or remote provisioning of the processor-controlled video camera, whereby the playback and, or provisioning is facilitated via a client device user interface. 1130

CLOUD-BASED SEGREGATED VIDEO STORAGE AND RETRIEVAL FOR IMPROVED NETWORK SCALABILITY AND THROUGHPUT

CROSS REFERENCE TO RELATED APPLICATIONS

This application is a continuation of U.S. patent application Ser. No. 16/172,479, filed Oct. 26, 2018, which is a continuation of U.S. patent application Ser. No. 15/463,516, filed Mar. 20, 2017, which is a continuation-in-part of Ser. No. 14/337,962, filed Jul. 22, 2014, which claims priority to U.S. Provisional Patent Application No. 61/857,200, filed Jul. 22, 2013, which are hereby incorporated by reference in their entirety.

BACKGROUND OF THE INVENTION

Field of the Invention

This invention is in the field of Internet or network connected cameras and scalable cloud computing, and more particularly, relates to scalable cloud solutions providing for higher though-put camera provisioning and event recognition.

Description of the Related Art

Webcams have become prevalent in modern life, and Internet server based systems that can use webcam video data, such as YouTube®, Skype® video chatting, and the like are widely known to the general population. Additionally, use of webcams and Internet servers, as well as various types of computer vision methods, for various monitoring applications is also known in the art.

As one specific example, various methods of using webcams for applications such as monitoring animal movements was described by Verstraeten et. al., "*Webcams for Bird Detection and Monitoring: A Demonstration Study*", Sensors 2010, 10, 3480-3503.

Further Needham, in U.S. Pat. No. 6,803,945 described a motion detecting web camera system. This system periodically uploaded webcam images to a server depending on various types of motion capture algorithms.

In recent years, as Internet technology has advanced, it has become more feasible to provide web services that can automatically scale upon user demand, often by use of various types of automated service provisioning methods and virtual machine migration methods. These scalable cloud services are described by Zhang et. al., "*Cloud computing: state-of-the-art and research challenges*", J Internet Serv. Appl. (2010) 1: 7-18. These cloud services include Amazon EC2, Microsoft Windows Azure platform, the Google App Engine, and others.

The Amazon EC2 cloud computing platform, for example, is described by Jurg van Viled et. al., "*Programming Amazon EC2*", published by O'Reilly Media, Inc., Sebastopol Calif., February 2011.

Additionally, as Internet technology has advanced, use of representational state transfer (REST) methods for the development of web services has become popular. This technology is described by Leonard Richardson & Sam Ruby, "*RESTful Web Services*", published by O'Reilly Media, Inc., Sebastopol Calif., May 2007.

There is a void in the art for a scalable solution for high-throughput camera provisioning and event recognition.

BRIEF SUMMARY OF THE INVENTION

The invention is based, in part, on the insight that advances in modern scalable cloud service technologies, such as automated service provisioning, virtual machine migration, and the like can be used to help provide improved and highly scalable methods to monitor real world environments.

This invention is also based, in part, on the insight that to provide a highly scalable system capable of widespread use with potentially millions of different video camera devices, and thousands or even millions of different client users, such a highly scalable system should ideally also employ various strategies to overcome firewalls and other network impairments, should be highly configurable by the various users, and should employ good security measures as well.

This invention is also based, in part, on the insight that normal users do not wish to act as full time security guards, but rather often wish to simply receive automatic notifications (preferably in real-time) on their mobile computerized devices when a computerized system automatically detects a problem or event, and then often immediately be able to either view the problem or event in real time, or alternatively search for a video file that contains a recorded history of the problem or event.

In some embodiments, the invention may be a system and method of monitoring real-world environments using a plurality of remotely programmable processor controlled Internet video cameras, as well as scalable cloud computing technology, using their various Internet connected smartphones and tablet computers, which will often be mobile devices such as Smartphones.

The system and method described herein is designed to be able to easily and automatically scale up to millions of cameras and users. To do this, this discourse teaches use of modern cloud computing technology, including automated service provisioning, automated virtual machine migration services, RESTful API, and various firewall traversing methods to facilitate the scaling process. Moreover, the system and method described herein teaches scalable cloud solutions providing for higher though-put camera provisioning and event recognition. The network may segregate the retrieval server from the storage server, and by doing so, minimizing the load on any one server and improving network efficiency and scalability.

The integrity of the system is maintained by requiring that the various video cameras continually send "heartbeat" camera status messages to the cloud servers. The video cameras, which optionally can have additional sensors such as microphones, temperature sensors, humidity sensors, smoke detectors, and the like can optionally also be remotely configured with various image and audio analysis and other sensor analysis algorithms that enable the cameras to automatically report to the system's servers those various events occurring in their local environments. The system servers can in turn detect and recognize events based on specific parameters analyzed by an event management system and report these events to clients. The system can either stream event video data directly or indirectly to the clients, or alternatively save the video data in various scalable third party cloud storage systems such as the Amazon S3 service. Time expiring tokens and encryption keys ensure system security.

BRIEF DESCRIPTION OF THE DRAWINGS

FIG. 3B shows a detail of a continuous recording server embodiment of the invention which is configured for high scalability across a large number of video cameras and clients.

FIG. 11 shows a method flow diagram describing the steps of achieving increased network scalability and throughput by use of a cloud-based segregated video storage and retrieval in accordance with an aspect of the invention.

DETAILED DESCRIPTION OF THE INVENTION

Figure 1:
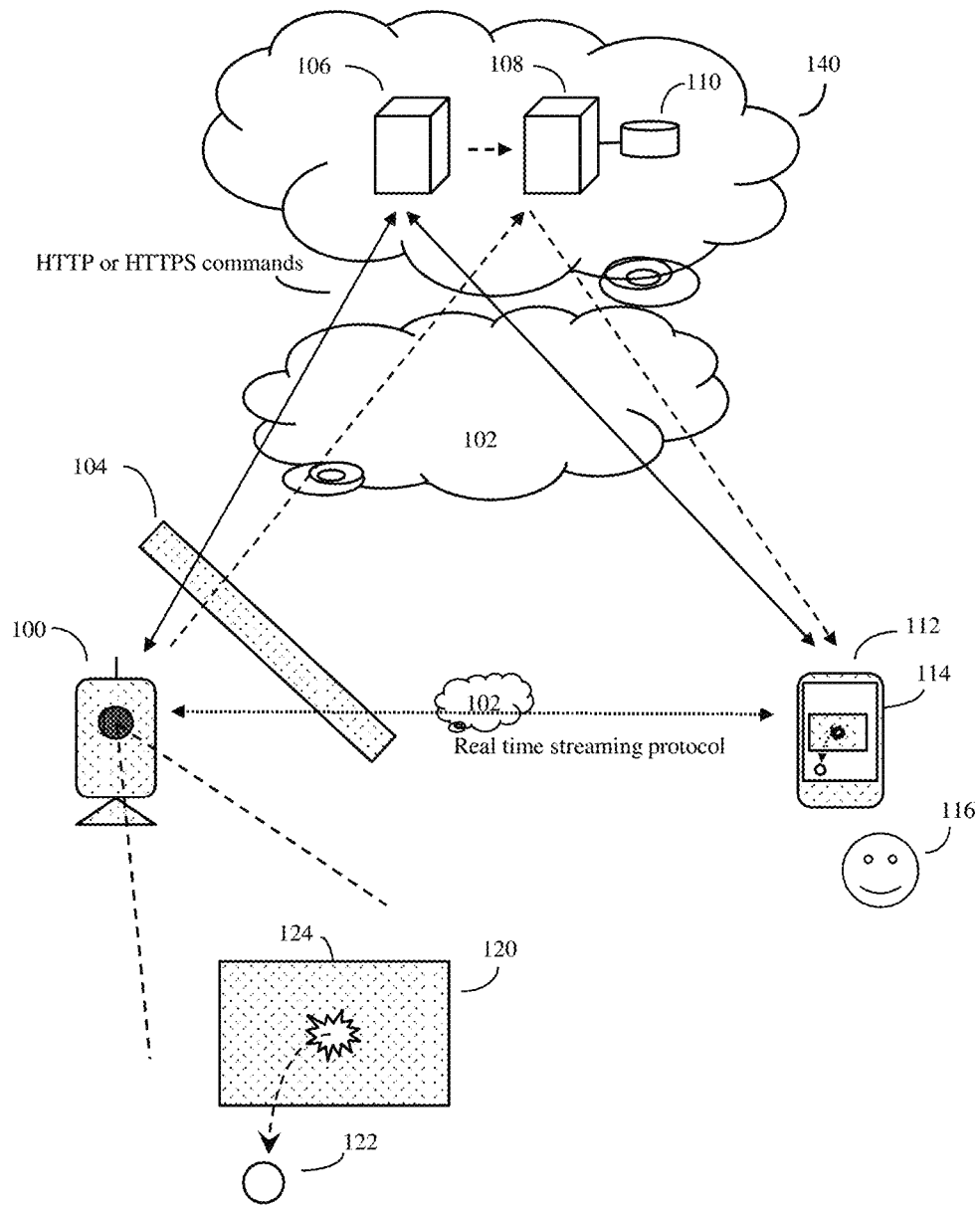
FIG. 1 shows some of the key components of the video cloud service (VCS).

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments For the purposes of this disclosure, "scalable methods" are defined to be Internet cloud based methods that operate according to automated service provisioning and automated virtual machine migration methods. See the previously discussed Zhang et. al., "*Cloud computing: state-of-the-art and research challenges*" reference for further detail. Examples of such scalable methods include, but are not limited to, Amazon EC2, Microsoft Windows Azure platform, and the Google App Engine.

Unless otherwise specified, the examples discussed herein should be assumed to be operating on the Amazon EC2 cloud computing platform, generally as described by the previously discussed Jurg van Viled et. al. "*Programming Amazon EC*2" reference.

Unless otherwise specified the processor controlled video cameras described herein will often be configured with microphones and even other types of sensors, such as temperature sensors. Thus the methods described herein will often operate on sound data received by these microphone configured video cameras. The processor controlled video cameras will typically comprise at least one processor (often chosen from the popular ARM, MIPS, x86 or other processor family), memory (used to hold the various firmware and algorithms according to the invention), at least one multiple pixel image sensor chip (often at least one charged coupled device (CCD) or complementary metal oxide semiconductor (CMOS) chip), an image focusing system (often at least one lens), and at least one wired or wireless network interface.

Unless otherwise specified, the client computerized devices described herein will often be configured with at least one processor (often chosen from the popular ARM, MIPS, x86 or other processor family), memory (often used for both operating system software and various applications software (e.g. apps) used to run the various firmware and algorithms according to the invention), typically a multiple pixel display panel, preferably capable of displaying video, a user interface (e.g. touch sensitive video screen, keyboard, mouse, buttons, etc.), and at least one wired or wireless network interface. Often mobile client computerized interfaces such as smartphones, tablet computers, and the like will be used as examples in the present disclosure, but "mobility" is not intended to be limiting.

Similarly the various Internet servers and cloud services described herein, even when operating under automated service provisioning and automated virtual machine migration services, will themselves run on various Internet servers under control of at least one processor, network connections, computer memory, operating system software, suitable automated service provisioning and automated virtual machine migration services, as well as the software implemented methods disclosed herein.

Unless otherwise specified, all aspects of the systems and methods described herein should be assumed to be operating automatically, without the need for human intervention, under the control of various processors (e.g. video camera processors, client computerized device processors, server processors, etc.) according to software methods operating according to the disclosures herein.

In some embodiments, the invention may be a scalable method of allowing at least one client (often a human client, and often a large number of different human clients) to monitor (often but not always in real time) at least one real-world environment (often a plurality of real-world environments) using a plurality of processor controlled video cameras.

These processor controlled video cameras will typically be connected to a larger computer network such as the Internet and hence to various Internet servers, and most commonly, for security purposes, such processor connected video cameras will be connected to the Internet and at least one remote Internet server via at least one firewall.

Here the at least one client will typically be connected to the Internet and the at least one remote Internet server using a client computerized device. In this specification, this at least one remote Internet server is often referred to as a video cloud service (VCS) server, and the device management service (DMS) aspects of this VCS server will be discussed in more detail shortly.

Often more than one client computerized device will be used, and this client computerized device may have its own firewall to contend with as well.

Here, the at least one processor controlled video camera(s) (camera, cameras) are configured (typically automatically or semi-automatically) to transmit audio-video data to the at least one remote Internet server. Additionally, this camera is also configured to respond to commands from this least one remote Internet server, and to periodically transmit camera status messages (often called "heartbeat messages" or "heartbeats") to this at least one remote Internet server using over the network connection. As will be discussed, these camera status messages (heartbeats) can be used by the system to, among other purposes, detect if the camera(s) are turned off or otherwise operating not as expected.

The camera(s) will generally be used to monitor at least one real-world environment, and then use the at least one Internet server to automatically transmit data pertaining to this at least one real world environment to the various client computerized device(s). Additionally, if the at least one Internet server detects either an absence or abnormality of these camera status messages (heartbeats) that persists beyond a predetermined cutoff criteria, then the invention's software will automatically direct the Internet server(s) to transmit data pertaining to this absence or abnormality to the at least one client computerized device. Additionally, at least some (and in some embodiments all) of the various processor controlled video cameras are also software configured to connect and send video data to at least one client computerized device immediately upon demand by a client computerized device.

System Architecture

At the highest level, the scalable video cloud service system and method disclosed herein can be viewed as having at least three basic types of components. These are a) various scalable cloud servers, b) various client computerized devices (often mobile devices such as Smartphones and the like), and c) various processor controlled video cameras, typically with network connections to the various cloud servers via the Internet.

As will be discussed, the present disclosure teaches a complete and comprehensive suite of event and video management solutions using cloud servers for uploading the event data from the cameras and retrieving event data from various client computerized devices such as smartphones. The actual cloud server solution is relatively complex, and has multiple components, including components and servers for load balancing, applications, storage, backup, database, device management, event management and notification/alert services. To begin with, we will focus on describing a simplified version of the system, in which the cloud services can be understood as comprising a management cloud server, and cloud servers for storing video data. After this more simplified version of the system is described, we will then discuss how the other cloud components relate to the overall system and method.

FIG. 1 shows some of the key components of the video cloud service (VCS). Here at least one processor controlled video camera (100), is connected to the Internet (102) via either a wireless (e.g. WiFi link) or wired link to an Internet connected router, usually via firewall (104). The client computerized device may also be separated from the Internet via its own firewall as well (not shown). Various servers, such as a remote VCS Internet server (106), and optionally at least one Internet connected video data storage device (108) (which itself may be a server) and associated database memory (110) can connect with the at least one processor controlled video camera (100). Additionally, various client computerized devices (e.g. Smartphones, tablet computers, laptop computers, desktop computers and the like 112) can also connect to both the processor controlled video cameras (100) and/or the remote VCS Internet server (106) and the at least one Internet connected video data storage device (108).

In FIG. 1, processor controlled video camera (100) is shown monitoring at least one real world environment, here a window (120). In this example, an event (122) has occurred where a rock or ball has crashed through the window (120) producing motion, a change in the state of the window (a hole) (124), and also an associated sound (not shown) which may also be detected via an optional microphone (not shown) on the processor controlled video camera (100). According to the invention, using details to be discussed, the client computerized device (112) has a video screen (114) configured to enable the client (116) (who is usually remote from the real world environment 120) to view video data showing the at least one real world environment (120) and event (122).

As will be discussed, the at least one processor controlled video camera (100) will often be capable of more than just merely acquiring video (and optionally audio as well), compressing the video, and transmitting the video over the Internet.

As will be discussed, VCS Internet server (106) and/or the least one Internet connected video data storage device (108) (which itself may be a server) and associated database memory (110) may be configured in various different embodiments. In some embodiments, VCS Internet server (106) may be a large scalable video cloud that can simultaneously connect to very large numbers of different processor controlled video cameras (100), such as between 1 and 100 thousand or even between 1 and 10 million or more cameras. This connection will often be done on an automatic basis. In some embodiments, the at least one Internet connected video data storage device (108) (which itself may be a server) and associated database memory (110) may be configured to enable cloud storage of event videos through the invention's Video Cloud Services (VCS) methods. This Internet connected video data storage may be through third party servers which offer various file storage and serving platforms.

As will be discussed, often a plurality of different client computerized devices (112) may be used, but for simplicity this plurality of different computerized devices will often be spoken of in the singular form. This use of the singular form is not intended to be limiting, and in general the claims and invention should be understood as operating with a plurality of client computerized devices (indeed the invention can scale to millions of such devices), and indeed often with a plurality of different clients (116) (potentially scaling to millions of clients) as well. Although for simplicity, often mobile client computerized devices such as Internet connected versions of the popular Android, iOS, or Windows smartphones and tablets will be used as specific examples of client computerized devices (112), these specific examples are not intended to be limiting.

In FIG. 1, note that server (106), Internet connected video storage device (108) and database memory (110) are all shown as being located in cloud (140). This is intended to both designate and remind the reader that the server (106), Internet connected video storage device (108) and database memory (110) are in fact operating according to scalable Internet cloud based methods that in turn operate according to automated service provisioning and automated virtual machine migration methods. As previously discussed, examples of such scalable methods include, but are not limited to, Amazon EC2, Microsoft Windows Azure platform, and the Google App Engine. Thus, for example, server (106) and Internet connected video storage device (108) will often be implemented as automatically provisioned virtual machines under a cloud service system that can create a greater or lesser number of copies of server (106) and Internet connected video storage device (108) and associated database memory (110) according to the underlying demands on the system at any given time.

Thus, in some embodiments, the system and method can produce a large scalable video cloud service that can connect to and manage very large numbers (e.g. up to 100,000, 10 million, or even more cameras simultaneously. The system is generally configured to automatically connect to the various cameras, and enable cloud storage of event videos through these video cloud services. As will be discussed, the system provides methods to detect that the cameras are on and functioning properly (e.g. camera "heartbeat" status messages), as well as various simple methods to allow users (e.g. human clients) to manage the system when needed, and view remote events as desired using apps running on various mobile computerized devices, web browsers running on various computerized devices, and the like.

As will be discussed, the system (140) provides various alert management services and device management services, and also allows for encrypted and secure exchange of data. The system can transmit video to its users using various media relay server methods, as well as using peer to peer (P2P) streaming of live video (and usually audio) from the various cameras to authorized clients. The system also will typically be configured with automatic data backup.

As will also be discussed, other embodiments of the invention may also provide various web sites (portals) for system management and analytics, and other functions such as load balancing to handle large amounts of load, and systems to handle spike and instant surge handling of large data loads from the various cameras. Additionally, the system can be configured for intelligent & adaptive video streaming and bandwidth throttling.

The processor controlled video cameras (100) can be configured to offer various types of capabilities, including video analytics, real time streaming protocol (RTSP) or other protocol type video streams, HTTP live streaming (HLS) video files, automatic event detections and triggers, as well as an ability to upload video to various storage devices. In addition to allowing connections to the various video cloud servers (to be discussed), the cameras can also be configured with various systems for authentication and validation, and optional use of secure connections such as secure sockets layer (secure SSL), transport layer security (TLS) and other cryptographic methods to ensure security. The cameras can be configured by the system to support live streaming, support media relay servers, and may optionally also have various network translation (NAT) gateway traversal techniques and components to help support peer-to-peer operation and connection with various client computerized devices as desired.

Put alternatively, at least some of these processor controlled video cameras may thus be configured to transmit data through the at least one firewall using various methods, such as Websockets (discussed in RFC 6455), STUN (session traversal utilities for NAT, discussed in RFC 5389, 5766, and 5245), TURN (traversal using relay NAT, discussed in RFC 5766, 5245, and 6156), ICE methods (Internet connectivity establishment, discussed in RFC 5245, 5766, 5768, 6336, and 6544) or other firewall traversing protocols.

In other embodiments, the processor controlled video cameras (100) may also be configured to automatically detect when a matching user computerized device(s) has network connection that is local to the camera(s), thereby allowing the camera to handle local users using more rapid local network connection methods. Microphone equipped cameras may also be configured to analyze audio from their respective real world environment, and detect and report on audio events.

The processor equipped video cameras may be equipped to handle low light situations (e.g. night time vision) via use of more sensitive video detectors, appropriate signal processing, or by using infrared sensitive video detectors and illuminating the local environment with infrared light. The cameras may also be equipped with other types of sensors (e.g. temperature sensors, humidity detectors, smoke detectors and the like) and these other sensors may also be used to indicate when various events in the real-world environment may need more careful monitoring by the client.

As will be discussed elsewhere, the cameras will typically be configured to allow automatic setup (e.g. camera provisioning), and remote client login and adjustment of various camera parameter settings. The cameras may further be configured with various types of camera diagnostics to assist in debugging. These diagnostics may, in some embodiments, further be used in conjunction with the various camera "heartbeat" status messages, as will be discussed. In a preferred embodiment, the cameras will be configured to turn on and initialize as rapidly as possible (e.g. instant on and immediate connection).

The client computerized devices may comprise devices running Apple iOS, Android, Windows, Linux, or other type operating systems. The portion of the invention's software running on these devices may be in the form of a native application, or it may be run as an interpreted app or run under various constraints such as Java sandboxes, run as HTML5 applications, and the like. Generally, however, native applications tend to run more quickly, tend to have greater access to system resources, and are thus often preferred.

The client computerized device software will generally provide (at least via software) an ability for user logins, as well as an ability to preview the client's various cameras (e.g. cameras that the client has authorization to access), as well as an ability to handle multiple cameras. The client system software may additionally be configured to allow the clients to share camera access with guests and other users, review lists of recent events and the details of these events, and receive various system notifications and alerts. Additional functions can include live camera viewing, P2P communication, firewall traversing via networks and NATs, RTSP video player/viewing, HLS video player and viewing, an ability to locally or remotely archive events and videos, and an ability to connect with cameras on a remote basis.

The client computerized device software may also be configured to allow the users (clients) to set various camera parameters and settings, handle other camera associated sensors (e.g. microphones, temperature sensors, humidity sensors, smoke detectors). The software may also allow the user to sort through or filter various events, and attempt to select for the most valid and meaningful events according to various analytical schemes and algorithms. Other functions may include an ability to view other shared cameras, designate some cameras as public cameras, and view camera timelines and past recordings using various types of digital video recorder (DVR) like features (e.g. fast forward, stop, rewind, fast rewind, slow motion, etc.).

Video Cloud Services

The system may support a wide variety of cameras, and in a preferred embodiment this includes cameras that are able to communicate with the servers through the REST API. The cameras will typically be configured to initiate a connection requests, and then do initial authentication using, for example, an access API KEY and User ID and Camera/Location ID (such as a media access control (MAC) address). When a session is created with the remote servers and a session key is issued, this session key may then be used for all subsequent camera communications to securely exchange data between various camera/clients and the video cloud services. The camera can then upload data such as event metadata, JPG images, and H.264 or other video format event videos, and the like to the system's cloud servers for later retrieval.

User Management Services

In some embodiments, the software may be configured to provide various types of User Management Services (UMS). These in turn provide the ability to create and manage users through the use of the REST API or other methods. The user management services may be integrated into various web portals, thus allowing users to manage their cameras and view/manage various events. In some embodiments, session management may also be integrated into the API calls so that all data exchanged will be secure. Optionally UMS systems can also consult and check with other external user login/password system to authenticate various users' logins.

Alert Management Services

In a preferred embodiment, the invention will be configured to provide alerts to various client computerized devices (e.g. mobile phones and web browser clients) anytime an event is generated through the system's alert management services (AMS) system, or filtered according to various schemes set up by the system or the user. This system can be configured to allow users to subscribe to individual event notifications based on that user's particular needs. The alert management system can provide users with real-time alerts to manage the events as they are detected. This system may also be configured to relay events using other services, such as Apple Push Notification Service, Google Cloud Messaging, other cloud services, and other techniques (e.g. simple messaging service (SMS), email, automatic phone calls, audio alarms, and the like). In some embodiments, the system can also allow users to subscribe or enable multiple types of alerts (e.g. SMS & Email).

Device Management Services

The Device Manager Services (DMS) software module may be used to overcome any Firewall/NAT issues that may be hindering Internet access for the various system devices in any network. The DMS may additionally be configured to provide the ability for clients to seamlessly communicate with the camera to exchange control data for provisioning, control bandwidth used by the camera or client computerized device, upgrade firmware, facilitate P2P streaming, and the like. The DMS software module may also be used to keep track of all devices (e.g. cameras, client computerized devices) that are registered to its services and provide at least the system managers or other authorized users with the status and availability information for each device that the user is authorized to audit.

P2P Video Streaming (Peer to Peer Video Streaming)

In some embodiments, the system may transmit data to client computerized devices (e.g. smartphones and the like) using various methods, such as mobile phone apps and or browser clients (e.g. HTML5 web browser clients). Either software can be configured to directly connect to a given camera using the DMS. In some embodiments, the DMS will operate by then providing a RTSP URL for the camera which is accessible to that client computerized device wherever the device or camera is on the network. The client computerized device will then be able to retrieve the RTSP data stream, decode the video and any audio (e.g. H.264 video and AAC Audio or other format video and audio) and play it back on the client computerized device. For direct camera to client computerized device access, this may be done using through P2P methods. Alternatively, such as when P2P methods are not feasible, the system may automatically use a relay server (e.g. media relay server) to help ensure that the camera is always available for access.

Session Services

In some embodiments, the various video cloud services, user management services, device management services, and alert management services may all use session handling to securely exchange data between the server and the various client computerized devices. Here API keys may be generated to allow only authorized users to access to the services. Here, for example, these services can validate the user and create a unique "session key" that may be further encrypted using, for example, secure hash algorithms (SHA) or other methods. Thus session key may only be known by the various services and devices generating the session and may be used to help ensure secure communications. The session key may also be set to expire after a set period of times (e.g. 4 hours) to help prevent misuse.

Client Computerized Device Software

In some embodiments, the system may operate using a client computerized device running software (e.g. an app, other type of software, HTML5 web browser client, etc.) that runs these various VCS, UMS, DMS, and AMS services. This client computerized device software may be configured to provide the user with ability to use some or all aspects of the system described herein. This can include creating new accounts, managing existing accounts, configuring cameras, viewing events videos, viewing live video, and so on.

Figure 2:
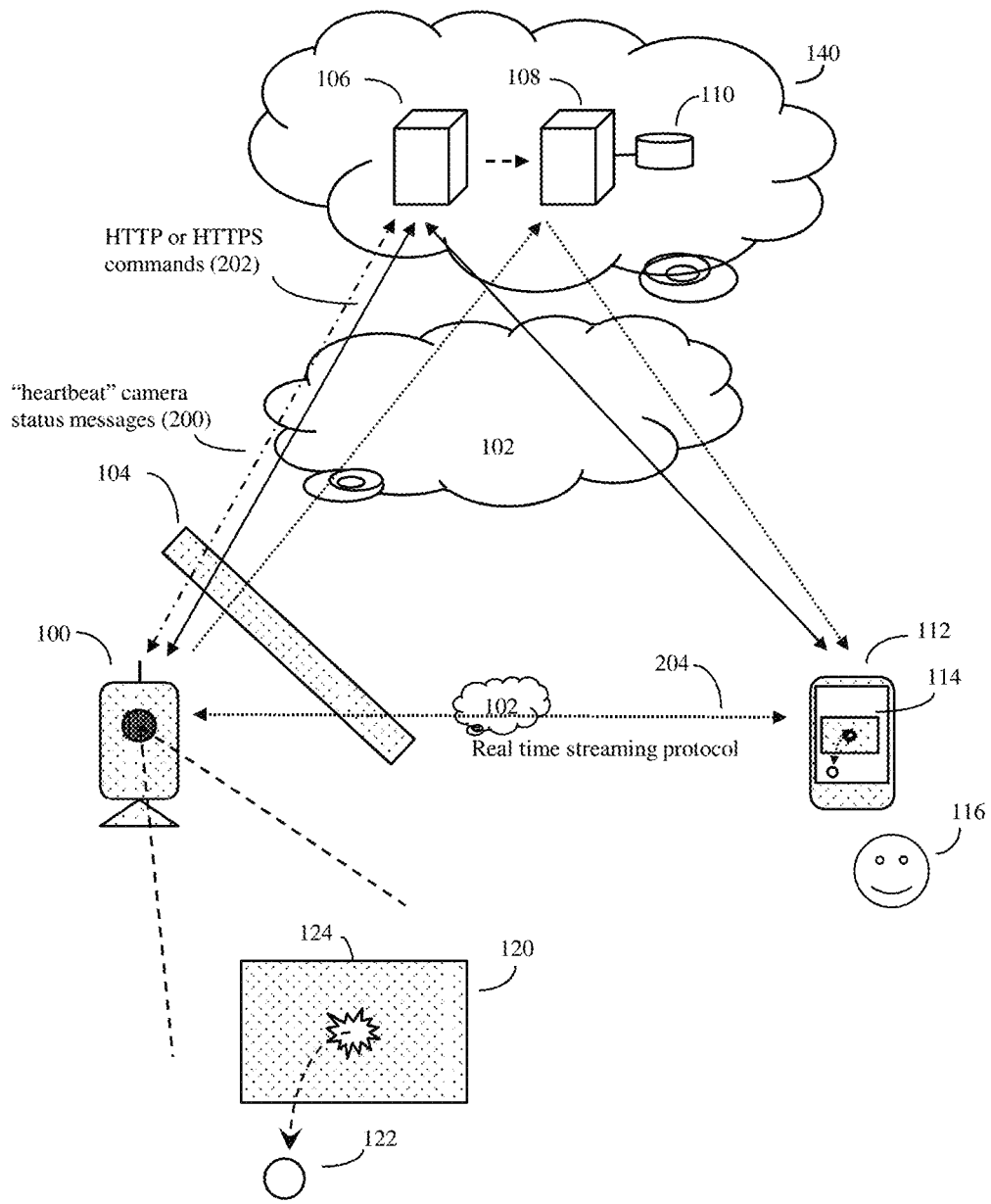
FIG. 2 shows further details of how the processor controlled video cameras may communicate with at least one remote video cloud service (VCS) Internet server and optionally other cloud servers such as servers used as Internet connected video data storage devices using various protocols.

FIG. 2 shows further details of how the processor controlled video cameras (100) may communicate with at least one remove VCS Internet server (106) and optionally other cloud servers such as servers used as Internet connected video data storage devices (108) using various protocols. The cameras (100) may continually inform the VCS Internet servers (106) of their status (e.g. camera on and connected or not) via a series of "heartbeat" camera status messages (200). In order to help transmit data through any firewalls (104), the cameras (100) may also communicate with the VCS Internet servers (106) and optionally other servers such as (108) through HTTP and HTTPS protocols (202), which firewalls are generally configured to accept. In some embodiments, the cameras (100) may also be configured to communicate to any of the VCS Internet servers (106), as well as other servers used as Internet connected video storage devices (108), and/or the client computerized devices (114) using peer-to-peer video streaming methods (204). These peer-to-peer video streaming methods can include real time streaming protocols (RTSP), optionally with the aid of IP allocation servers (e.g. TURN "traversal using relays around network address translators (NAT)" methods, systems, and the like. Examples of TURN methods are provided in the previously discussed Internet Engineering Task Force (IETF) Request for Comments documents such as RFC 5766, RFC 6156, RFC 7065, and the like.

Thus the system can enable various client computerized devices to configure, control and view media from the enabled cameras. To do this, one or more of the various servers, can for example, host one or more web applications, which can in turn serve as the intermediary for communication and authentication between the client computerized device and the camera. Other server interfaces may also be used. In either approach, the client computerized devices and cameras can make requests to the server. This approach can also be used to provide the present status of the camera to the server. When this happens, the server may either respond back with just an acknowledgement, or with additional data for configuration/updates.

In the event that the client, using the client computerized device, wishes to update the camera configuration, the client can do this by using the client computerized device to post the data to the server. The server can then send an update flag to the camera through the open communication mechanism that the camera has initiated. The camera can then retrieve the camera configuration list specific to its device ID from the server.

Thus here the at least one remote Internet server can host at least one web application or other communications interface, and at least the client computerized device can use this web application or other communication interface to communicate with this server and the various processor controlled video cameras.

Client Computerized Devices

In this context, note that the client computerized devices can send commands to the server to, in turn, have the server configure and request live streams from the various cameras. Here, the client computerized devices can use various unique camera/device identifiers to specify exactly which camera is to be adjusted. These identifiers, along with suitable commands, can be sent to the server, which will in turn relay these commands to the appropriate identified camera. The client computerized device can also display a list of what camera videos, and what event videos, are stored on the cloud storage servers for the user to view. The client computerized device can also relay any alerts to the user regarding any new events.

Processor Controlled Video Cameras

In this context, as before, remember that the processor controlled video cameras (camera) can be configured to automatically detect video or audio events, using various image processing and sound processing algorithms, and upload videos triggered by these events to the system servers. This in turn can trigger the system servers to send notifications (e.g. push notifications) to the appropriate client computerized device informing the client that an event of potential interest is occurring (or has occurred). The camera may also attempt to maintain a continuously open connection network to the cloud server in order to receive any control data back from the server or the client computerized device. The camera will be usually configured so that if the camera detects that the network connection to the server(s) has been lost, the camera will immediately attempt to connect back and the server, thus helping insure that communication can be maintained whenever possible.

Depending on the client's network, the camera will often be configured to stream live video at various compression levels and quality standards to match the available bandwidth provided by that particular network connection (e.g. 3G/4G, WiFi, LAN). Alternatively, the server may be configured to step in and further down convert video to a still lower number of bits per second if the server or the user determine that the camera's efforts to cope with poor quality networks is insufficient.

As will be described in more detail shortly, the camera may also be configured to specific networks and matched with specific users via various types of provisioning process, such as by use of bar codes (e.g. QR codes), audio signaling, other network transmissions, and the like. In general, the camera will be configured with a default mode in which the camera is tied to a specific user through that provisioning process. Unless otherwise configured, generally only authorized users will be able to access the various cameras and view any particular video or live stream. On initialization, for example, the camera software can be programmed to expect to view a certain type of optical signal (e.g. barcode QR code, light pattern, etc.) and to use this type of optical signal to then configure various aspects of camera operation.

Figure 3A:
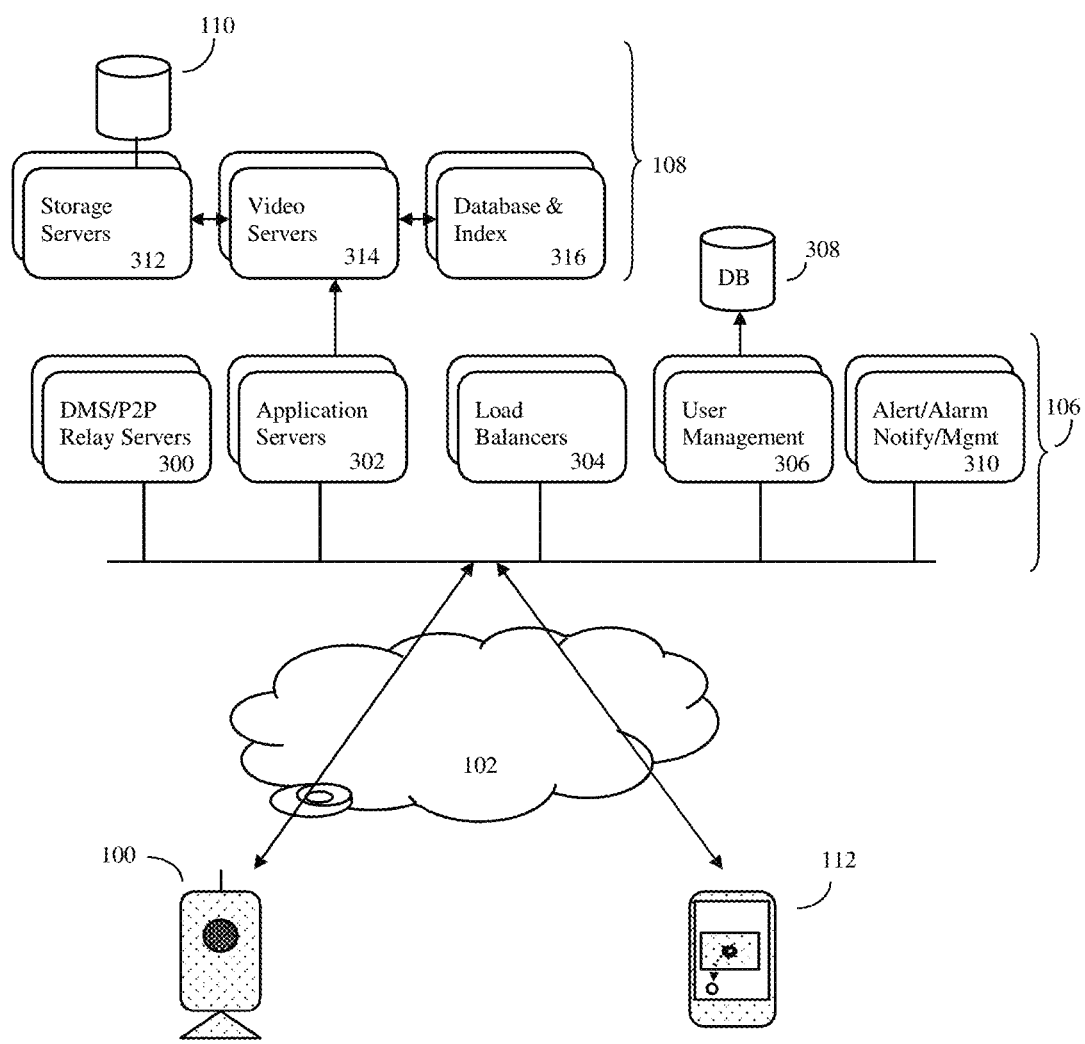
FIG. 3A shows a block diagram showing some of the components and interactions of the invention's video cloud service (VCS) system.

FIG. 3A shows a block diagram showing some of the components and interactions of the VCS system. As can be seen, often the functions of VCS remote Internet server (106) can be implemented as a plurality of different servers using modern cloud architecture techniques. This plurality of cloud based servers can include distributed multimedia systems (DMS) peer-to-peer (P2P) servers (300), application servers (302), load balancer devices (304), user management servers (306) (often connecting to databases (308) for user data), and other servers and devices (310) used for the purposes of managing the system (e.g. generating alerts and alarms, notifying management, etc.). The functions of the servers used as Internet connected video storage devices (108) may also be handled by a plurality of different servers, such as various storage servers (312) (often used to manage database 110), video servers (314), various database and index software and memory management devices (316), and the like.

Server-Camera Communication and Interfaces

As previously discussed, in some embodiments, the camera and the server may be configured to communicate using a secured, state-less RESTful API. Here the API exposed by the system relies on discrete requests where no information is maintained in the HTTP session. As a result, any server can serve up any camera request without need of server clustering. This state-less method also helps facilitate system scale-out horizontally on demand.

Thus in these embodiments, the video uploads are done in a staged, event driven manner ideally designed to work even on somewhat unreliable networks, and without overloading a single HTTP request. This allows the system to operate quickly, and also helps ensure that even in adverse situations; at least a few parts of the video are uploaded. In event that data is lost, the system can optionally retry to obtain the video as a series of smaller sized data requests, which generally is less burdensome than attempting to upload an entire video as a single request.

In this preferred embodiment, use of event driven architecture (SEDA) also allows the system to alert the camera owner (user, client) instantly as soon as an event is created from the camera, and without waiting for the camera to upload the video.

In some embodiments, the camera can also use the SEDA approach to parallelize the video segment approach, and achieve faster video uploads by simultaneously connecting to multiple servers.

Note that the system also allows various types of metadata information to be applied to the various objects and data files, including the various cameras and events. Additionally, any arbitrary type of media may also be uploaded. This flexible approach allows the system to serve as a cloud service backbone for any camera device.

Put alternatively, according to these methods the at least one Internet server can communicate with either the processor controlled video cameras, and/or client computerized devices, according to a staged event driven architecture. This can be done using a representational state transfer (REST) applications programming interface (API), and thereby producing an HTTP or HTTPS session where no information is maintained in this HTTP or HTTPS session. This improves the scalability of these methods.

Security/Authentication

Various approaches may be used to maintain security and authenticate various cameras and client computerized devices. One way is to use a time expiring key and secret pair to authenticate the connected devices. The advantage of this approach is that this authentication method can be done without having to maintain a session in the HTTP/Application server. This in turn helps the system scale horizontally upon demand.

In one embodiment, this process authentication process can operate as follows:

a) The device authenticates to VCS with a secret API KEY and API PASSWORD over HTTPS/SSL.
b) The VCS allocates a time expiring secret key and password to the device, which it will use for all future requests until these expire.
c) In all the following requests the device sends in the secret key and SHA hash of the password with time, so as to ensure that the password cannot be hijacked on the wire.
d) The secret key is also tied up to a unique key (local id) identifying the device uniquely, which is again SHA hashed to time in the devices.
e) The SHA hashing and time stamping helps ensure that anyone listening over the wire cannot spoof the requests.
f) The time expiring keys help assure that the keys cannot be used even if someone manages to break the SHA hash by brute force.

Put alternatively and more simply, communications between the various processor controlled video cameras, various system Internet servers, and various client computerized devices can be secured by using at least one time expiring token and at least one encryption key.

Camera Provisioning (Network Configuration and Binding to Client Computerized Devices)

To expand on a previous discussion, in some embodiments, the system can provision (e.g. do network configuration and binding to specific client computerized devices) the cameras using optical methods. Here, for example, when a user installs a new camera (or reconfigures an existing camera), the user can use the user's client computerized device to sign into the system and request a new camera setup. For example an app running on the client computerized device can request that the server generate a camera setup token, such as an optical bar code or QR code, that the processor equipped camera can then read and use to extract configuration information. This camera configuration can include information such as the WiFi SSID (service set identifier) of the local network connected WiFi router, local WiFi Password, and other information such as the location identification code, customer identification, camera token, and the like.

In this example, assume that the camera has a WiFi transceiver, is default configured with at least some of the invention's software, and is otherwise not yet connected to the Internet. Here the client computerized device can generate the appropriate QR code, which is then either displayed on the display screen of the client computerized device, or printed out. When this QR code is shown to the camera, the camera processor, using suitable bar code recognition software, can extract the WiFi SSID and password and use this information connect to the Internet, possibly using a cloud server URL previously stored in the camera system software, or alternatively provided by the QR code as well. The camera and server can then take the locale code to setup the default system server URL depending on the location of the camera. This scheme thus allows any camera to be provisioned to the system servers according to the camera's geolocation.

The camera can then take the customer ID, camera token, and camera ID and register with the system server. Upon successful registration, the camera will be allowed (and able) to start sending "heartbeats" (e.g. camera status messages) to the system server (e.g. DMS server). Once registered, the camera is now configured on the system server and also automatically associated (provisioned) to the appropriate user.

Other methods of configuring the processor controlled video cameras for network operation are also possible. These methods can include using one or more bar codes or other type optical codes that encode at least some information selected from the group consisting of WiFi SSD, WiFi passwords, locate code, customer ID, and camera token. Other alternative methods of camera configuration include using network communication information encoded as a series of audio sounds, or variations in light or infrared intensity or color; or using Bluetooth™ or WAP or other wireless based methods to transfer the appropriate network setup data. The camera software/firmware may be configured to attempt to be provisioned by multiple methods, so that in the event that one method of provisioning found to be unsuitable, an alternative method of provisioning may be automatically (or manually) selected.

Video Storage

In some embodiments the system may store the videos using third party cloud service providers such as Amazon S3, Rackspace Cloud Files, Google, etc. These vendors provide highly scalable, on demand, pay as you go file storage and serving platforms. Although the present invention can work with all types of storage, in some embodiments use of such third party scalable cloud service provides can be useful.

To help facilitate the process of storing/serving large number of videos, while keeping the costs to minimum, keeping the videos secure, while still making it easy for a validated end user to view, in some embodiments the system may store the various video files and other files as encrypted uniform resource identifiers (URI), such as 128 bit encrypted URI. Such encrypted URI can be transparently fetched by the user application when the user logs into the system and can directly be played in any player supporting that video format.

In some embodiments the system may further use commands from at least one remote Internet server to further configure the processor controlled video camera to stream video data directly to at least one Internet connected video data storage device, and store this video data in the memory of this video data storage device, thereby creating remotely stored video data.

In some embodiments, this video data storage device can be provided by third party cloud file hosting services or other cloud file hosting services that operate according to the previously discussed automated service provisioning and virtual machine migration methods. Of course there is no actual requirement that "third party" servers be used per-se, and indeed the operator of the system, if they wish to assume the rather considerable expense, can provide their own scalable servers as needed.

Regardless of type of video data storage device, in these embodiments, the system can use the remote Internet server(s) to either transmit or receive information pertaining to these remotely stored video data to or from various client computerized devices, thereby enabling these client computerized device to subsequently retrieve this remotely stored video data (this can be as simple as the system telling the client the 128 bit encrypted URI of the stored video data, or by other methods). Note that here, the Internet connected video storage device(s) are generally either housed by the remote Internet server(s), or else not housed by the remote Internet servers.

Events, Event Search and Event Management

In some embodiments, the processor controlled video camera may be further configured to use various audio or video detection parameters to automatically detect event induced changes in the camera's real world environment. According to these detection parameters, the camera can then transmit data pertaining to these event-induced changes to the remote Internet server(s). Here these detection parameters may be configured by the client computerized device(s) and these servers.

Once these detection parameters have been set up, the processor controlled video camera (using the camera processor and software operating according to these detection parameters) can then monitor the real world environmental location(s) for these events. If these events are detected, then the camera can relay data pertaining to these events to the Internet server(s), which in turn can transmit data pertaining to the event induced changes to the at least one computerized device Various types of events can be automatically detected and reported according to this scheme, including intrusion detection, motion detection (or motion detection by direction), camera tamper detection, face detection, audio alert, camera or other device offline alerts, other abnormal visual detection events, and other abnormal sound detection event.

Figure 9:
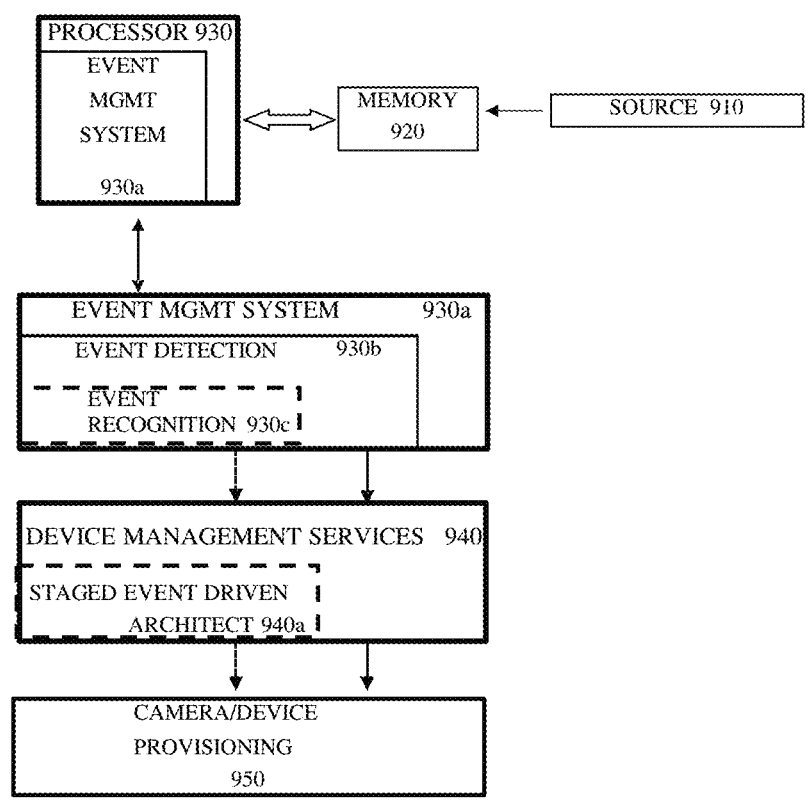
FIG. 9 shows a block diagram showing some of the components and interactions of the invention's video cloud service (VCS) system, more particularly, the event management system.
Figure 10:
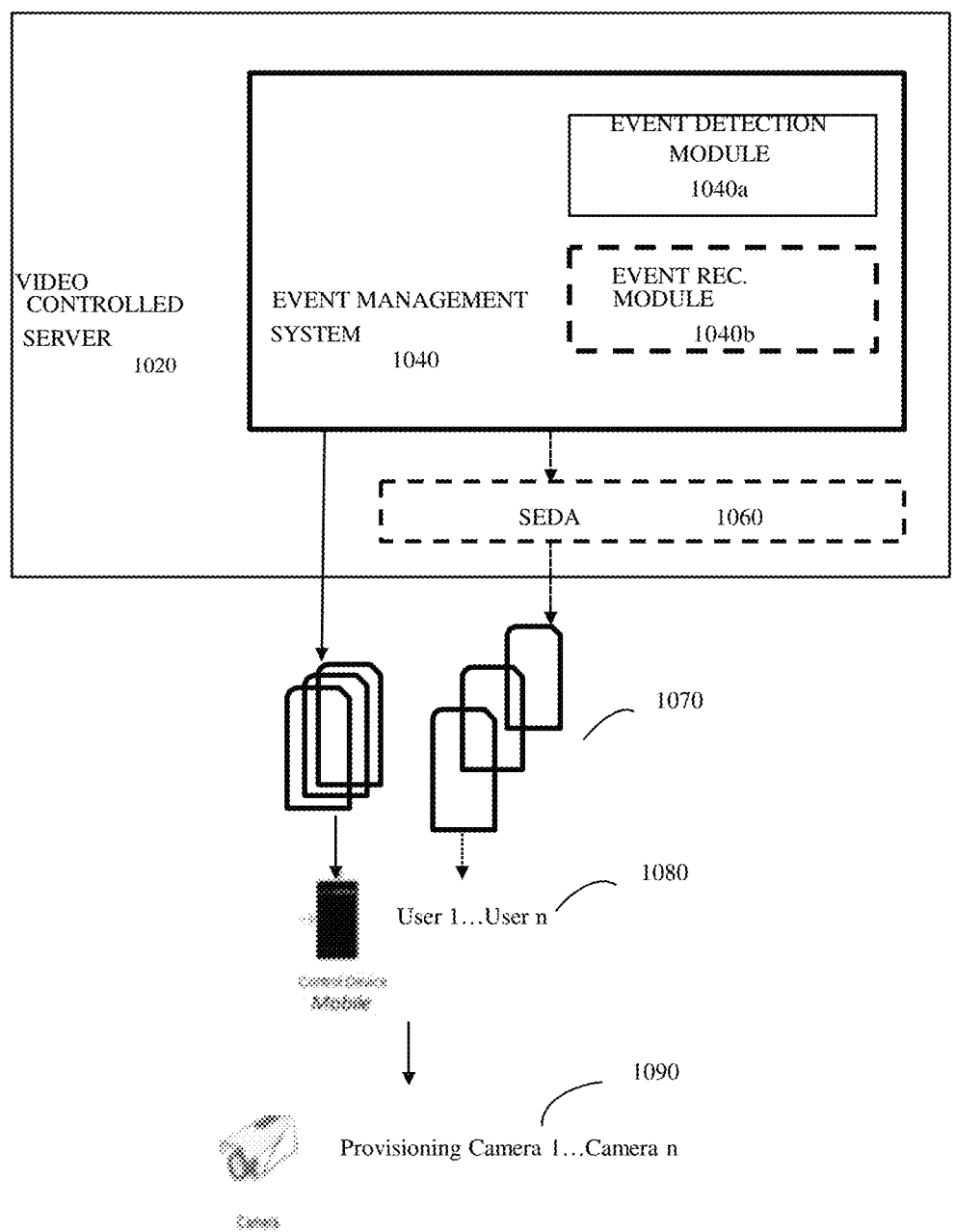
FIG. 10 shows a block diagram showing some of the components of the invention's video cloud service (VCS) system, more particularly, the event management system.

As FIGS. 9 and 10 illustrate, the video cloud service may further comprise an event management system 930a, 1040 further enabling event detection and recognition. The event management system 930a, 1040 may allow at least one client 1080 to monitor and, or playback at least one real-world recognized event via at least one processor-controlled video camera 1090, said system comprising: a processor 930; a non-transitory storage medium coupled to the processor 930; encoded instructions stored in the non-transitory storage medium, which when executed by the processor 930, cause the processor 930 to: detect a threshold-grade event from audio-video data of a real-world environment captured from a processor-controlled video camera 950, 1090 by an event detection module 930b, 1040a within an event management system 930a, 1040 applying event detection parameters. Next, analyze the threshold-grade event for categorization into any one of a recognized event by an event recognition module 930c, 1040b within the event management system 930a, 1040 applying event recognition parameters; transmit at least any one of a single stream of the recognized event and, or a single stream of audio-video sequence succeeding, and, or preceding the recognized event to a client device 1080. Finally, facilitate at least any one of a user defined playback of the single stream of the recognized event, user defined monitoring of the audio-video sequence succeeding and, or preceding the recognized event, and, or remote provisioning of the processor-controlled video camera 950, 1090, whereby the playback and, or provisioning 950, 1090 is facilitated via a client device user interface.

In another embodiment, still referring to FIGS. 9 and 10, the system may comprise a processing unit coupled to a memory element, and instructions encoded thereon, which instructions cause the system to: detect a threshold-grade event from audio-video data of a real-world environment captured from a processor-controlled video camera 1090 by an event management system 930a, 1040 applying event detection parameters; transmit at least any one of a single stream of the detected event and, or a single stream of an audio-video sequence preceding and, or succeeding the detected event to a client device 1080; and facilitate at least any one of a user defined playback of the single stream of the detected event, user defined monitoring of the audio-video sequence preceding and, or succeeding the detected event, and, or remote provisioning of the processor-controlled video camera 950, 1090, whereby the playback and, or provisioning is facilitated via a client device user interface.

In yet another embodiment, in continuing reference to FIGS. 9 and 10, the system may be configured to: detect a threshold-grade event from audio-video data of a real-world environment captured from a processor-controlled video camera 1090 by an event management system 930a, 1040 applying event detection parameters; transmit at least any one of a single stream of the detected event and, or a single stream of an audio-video sequence preceding and, or succeeding the detected event to a client device 1080 in a serial manner, wherein the audio-video sequence is divided into segments over a time frame comprising the detected event; facilitate user defined playback of at least one of the single stream of segmented audio-video comprising the detected event, preceding the detected event, and, or succeeding the detected event; and facilitate user defined remote provisioning of the processor-controlled video camera 950, 1090, whereby the playback and, or provisioning is facilitated via a client device user interface.

In one embodiment, the event management system 930a, 1040 may be configured to perform at least one of an audio, video, and, or image frame upload, save, retrieval, and, or playback in a staged-event driven manner (SEDA). Any upload, save, retrieval, and, or playback may be performed via a serial of audio-video-image segments over a time frame comprising a detected and, or recognized event. This has lower bandwidth impact on the server and network. Additionally, retrieval and playback may be possible once an event is detected and, or recognized by the event management system 930a, 1040—and not wait for the entire event or sequence of events to fully transpire.

Usually the system is able to determine whether a camera is offline through the "heartbeats" camera status messages that the camera(s) provide to the server. If these messages stop due to network problems, camera power, camera tampering, or any other failure means, the server can, for example, run through a finite state machine to and conduct various automated tests to determine whether the camera is actually offline. If the server determines that a given camera is offline, the sever can register that an appropriate event has occurred, determine if this event matches any client notification preferences, and if so notify the client computerized device by various methods (e.g. push methods, and the like).

More generally, these events can comprise one or more intrusion events, motion by direction events, camera tamper events, face detection events, person detection or recognition events, activity recognition events, audio alert events, camera off line events, temperature or home sensor alert events, events generated or detected by other sensors and transmitted to the processor controlled video camera, and other events that generate either an audio or visual signal that can be automatically analyzed by the processor according to the various detection parameters.

The event data can further comprise data that will be present in all the events, such as the real-world location that the event was recorded at, what camera or sensor recorded it, time and date when the event was recorded, status of the event (in progress, finished and completely recorded, etc.). Additionally, various media data can be attached to the event data. This event attachment or media data can be the actual audio or video recording of the event, which can optionally be stored as desired as a set of partial recordings over various time segments. Alternatively the media may be stored as an entire event comprising all event time segments.

Additionally, various types of other event metadata may be stored. This metadata can allow the event data and media to be used for variety of cases and devices and requirements without having to modify the server. This data can be, for example, be an arbitrary set of key values that the camera/device developer can utilize to store any information desired, and hence extend the event metadata.

The system may further comprise a second set of data input from sensors and, or collective data to inform a contextual data. The sensor data may be, but not limited to, microphone, temperature sensors, humidity sensors, and smoke detectors. Such sensors may be coupled to the processor-controlled cameras 1090 or may be exclusive of the camera 1090. The contextual data may also comprise collective data, which may include, but not limited to, weather station data, facility data, etc. The contextual data may further comprise meta data/event data relating to the real-world environment capture, event capture, and audio-video data feed of either types of capture. Furthermore, the contextual data may include the "heartbeat" messages, indicating the status of the camera 1090 and audio-video feed. In turn, the contextual data may feed into the event management system 930a, 1040 for enabling the system to determine a threshold-grade event or an event recognition. Any of the contextual data may be overlaid onto the single audio-video stream of the detected and, or recognized event, and does not require a secondary stream.

The system will also generally allow the user to use various client computerized devices to search event records, and sort or filter based on event date, type, location, metadata and so on.

Configuring Client Computerized Devices to Receive Event Notifications

The system is generally configured to allow users to register their client computerized devices (e.g. Android/iOS devices and the like) to automatically receive notification on any events detected by the user's cameras and sensors.

In general, the process of registering a client computerized device can be made agnostic as to the type of operating system that the device used. That is the system can abstract the process of registering any given computerized device, making the process similar regardless of device operating system (e.g. iOS, Android, Windows, Linux, etc.). The notification process can proceed by various messaging formats, such as HTTP/HTTPS messages or TCP or UDP messages or HTML5 websocket endpoint method, and the like.

The notification process is usually transparent to the camera/sensors. In some embodiments, all the cameras and sensors need to do is notify the server(s) when events occur, and the servers then take care of forwarding the event notice to appropriate registered client computerized devices.

FIG. 3B shows a detail of a continuous recording server embodiment of the invention which is configured for high scalability across a large number of video cameras and clients.

In some embodiments, the Internet connected video data storage device (108) may be configured as a continuous recording server (108a). This is shown in FIG. 3B. In this embodiment, as before, the continuous recording server (108a) uses an architecture that allows the system to scale to handle a very large number of video cameras (100), such as the previously discussed 1 to 100,000 or even 1 to 10,000,000+ range of video cameras.

In this embodiment, the goal is to capture video data as efficiently as possible for storage and later retrieval. Although in some embodiments, video recording will be occurring on a nearly continuous basis, client playback of the stored video data will typically only occur on an occasional basis. In this embodiment, the continuous recording server (108a) can be considered to comprise at least one Proxy Server (350), at least one recording server (352) and at least one media server (354). These in turn can reside on separate servers (as shown) or be virtual server instances that may reside in some cases on the same hardware as desired.

In this embodiment, the one or more proxy servers (350) may be configured to capture video and audio data from some or all of the various video cameras (100) through some or all networks. In a preferred embodiment, the proxy server(s) (350) are accessible through standard network TCP/TLS type connections. The proxy servers are configured to receive, multiplex and relay out video data, preferably in a standard format, to either one or more recording servers (352), and/or to other client computerized devices (112a) or through to various types of media servers (354). Additionally, as desired, the proxy server(s) (350) can also be used (in a later stage of the recording server 352 pipeline) to retrieve the video data from the scalable storage system (e.g. third party storage server 110, recording server 352) and stream this stored video data directly back to the client computerized devices as well.

In some embodiments, the recording server (352) can combine the video (and audio) data in a format that is easily consumable by various cloud system components (such as the media server 354 and proxy server 350) in the latter stages of the pipeline. The recording server (352) can also be configured to store the video data to any scalable storage (e.g. third party storage servers 110 such as the Amazon S3 Simple Storage Service, and the like) for later retrieval. The recording server (352) can also be configured to automatically update the VCS remote Internet server (106) with information about the stored video data so that this stored video data can later be retrieved by various client computerized devices (112).

In some embodiments, media server (354) may be configured to transcode the video (and audio) data into various standard streaming formats, such as real time messaging protocol (RTMP), HTTP live streaming (HLS) video format, real time streaming protocol (RTSP), and so on. This facilitates the process of efficiently displaying the video data on a large number of different types of client computerized devices (100).

In some embodiments, video cameras (100) may connect to the recording server (352) via the proxy server (350) or proxy service. This enables video data to be sent relatively directly to recording server (352), where it can then, for example, be stored in scalable storage (110) for later use. Alternatively, the video data may also be relayed to the client computerized device (112) without sending the data to the recording server (352). This can be done by, for example, pulling the recorded data back into proxy server (350) and then streaming the video data back out to the client computerized device either directly from the proxy server (350) (e.g. 112a) or indirectly via the media server (354) to client computerized device (112b).

Generally, the continuous recording server (108a) will also need to communicate with the DMS server(s) (300) and VCS remote Internet servers (106) to handle communication between the various video camera(s) (100) and the various client computerized devices (112). Here, for example, the various individual services may often communicate with the DMS (300) and VCS remote Internet servers (106) to retrieve previously recorded data, or to get the uniform resource locator (URL) of a particular video camera's (100) video stream.

Further Camera Control Functions.

In some embodiments, the system will also allow users to control various camera functions from their client computerized devices. Here the client computerized device, the remote Internet server(s), and the processor controlled video cameras can be configured to receive and act on commands such as camera pan/tilt/zoom commands, camera resolution change commands, camera lighting change commands, video streaming change commands, firmware upgrade commands, and various automatic event detection parameter commands.

In some embodiments, the system (e.g. DMS) servers may further comprise a web server serving web pages which in turn can be used for one or more purposes of authentication, authorization and communication between the various client computerized devices and the various cameras.

For example, in one such embodiment:
a) The camera connects to the server(s) via a variety of previously discussed means such as HTTP requests, long polling HTTP requests, bidirectional always open sockets, bidirectional always open web socket, extensible messaging and presence protocol (XMPP), messaging queuing telemetry transport (MQTT), and the like.
b) The camera(s) transmits camera status messages "heartbeats" and additional data to the server thus informing the server about the present status of the camera. These "heartbeat" camera status messages can be, for example, HTTP call/requests to the server, sockets type messages, XMPP messages, and the like.
c) Using the above established connection (or additional connections), the server in turn sends commands and associated data back to the camera, directing the camera to perform various operations such as c1) changing the camera's various control parameters; c2) respond to requests with data to establish peer-to-peer communication between the camera and the client computerized device, such as but not limited to ICE/STUN/TURN protocol replies; c3) respond with any kind of sensory data streams, which can be live or recorded video, audio, or any kind of sensory data; or c4) respond with acknowledgements of requests to change control parameters.
d) The client computerized device can also establish a connection to the DMS server using one of the various means previously described in step 'a' above.
e) The client computerized device can then send various types of camera control data to the server. This camera control data is interpreted by the server and relayed to the camera using the means established in step 'a' above. Additionally the server and or camera can also acknowledge or reply this camera control data by transmitting additional data (e.g. "command accepted", "command not accepted" etc.) to the client computerized device. Additionally, if the camera has sent any data to the server as in step 'c' above, then server can then optionally relay it back to the client computerized device as well.

Figure 4:
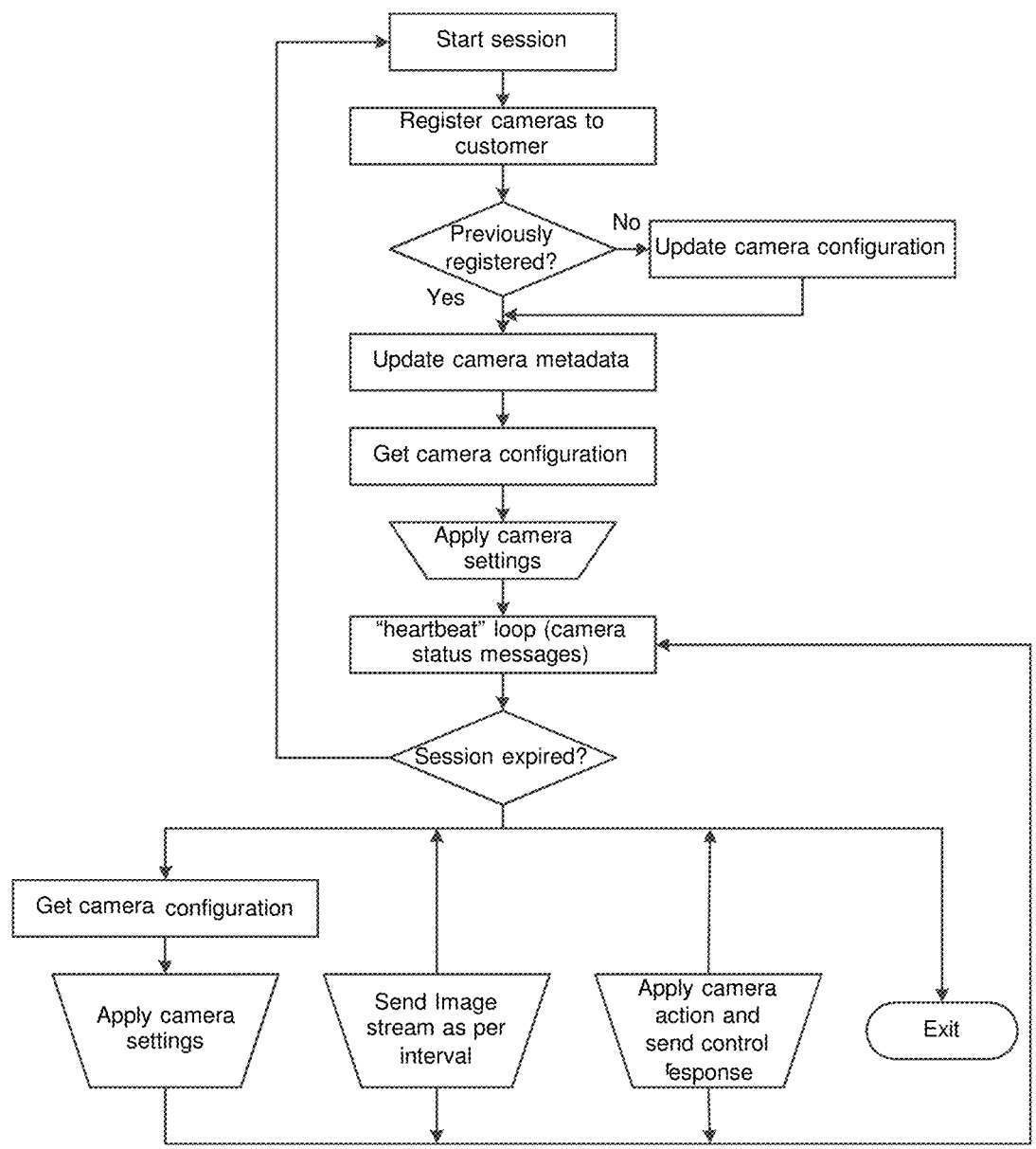
FIG. 4 show a flow chart of how the processor equipped video camera may interact with the system's device manager services (DMS) server.

FIG. 4 show a flow chart of how the processor equipped video camera may interact with the device manager services (DMS) server.

The camera (100) initially creates a session to start all communications with VCS remote Internet server (106) (e.g. DMS server (300). If camera (100) has not been previously registered, then the camera will then attempt to register itself with servers (106) or (300), and often a default configuration will then be used for this camera. Servers (106) or (300) will then retrieve any camera metadata associated with that specific camera (100), and this metadata will be stored in server (106), (108).

The camera metadata can contain various types of information identifying the camera(s) (100) including but not limited to: camera manufacturer, model, firmware version, and the like. Once registered, the camera will then retrieve the appropriate camera configuration, and enter into a "heartbeat" loop that will normally continue indefinitely while the camera(s) remain active.

In this heartbeat loop, the camera will periodically transmit "heartbeat" camera status messages to the Internet server (106), (300). This helps keep the connection to the remote sever alive. During this "heartbeat loop", the camera can also perform various other actions including, but not limited to:
a) Updating the camera configuration (e.g. camera retrieves any updated camera configuration parameters from the server (106, 300).
b) Handing image stream requests (e.g. camera sends a video image stream to the server (106, 300) to be relayed to the client computerized device(s) (112) for instant-on live streaming, often upon demand by the client (116) through the client computerized device (112).
c) Handling camera control requests—here the camera (100) retrieves any control data relayed directly from the client (116)(112), such as manual recording triggers, peer-to-peer streaming requests, data from other camera associated sensors (e.g. temperature, humidity, sound, motion) push-to-talk requests, firmware upgrade requests, camera reboot requests and so on.
d) Handling errors (e.g. camera configured to terminate the server connection upon receiving an error code, such as an invalid camera token, invalid session information, etc.).

The system can then be configured to take appropriate individualized corrective action depending upon the type of error.

Camera Firmware Upgrades, Client Computerized Device Software Upgrades.

Figure 5:
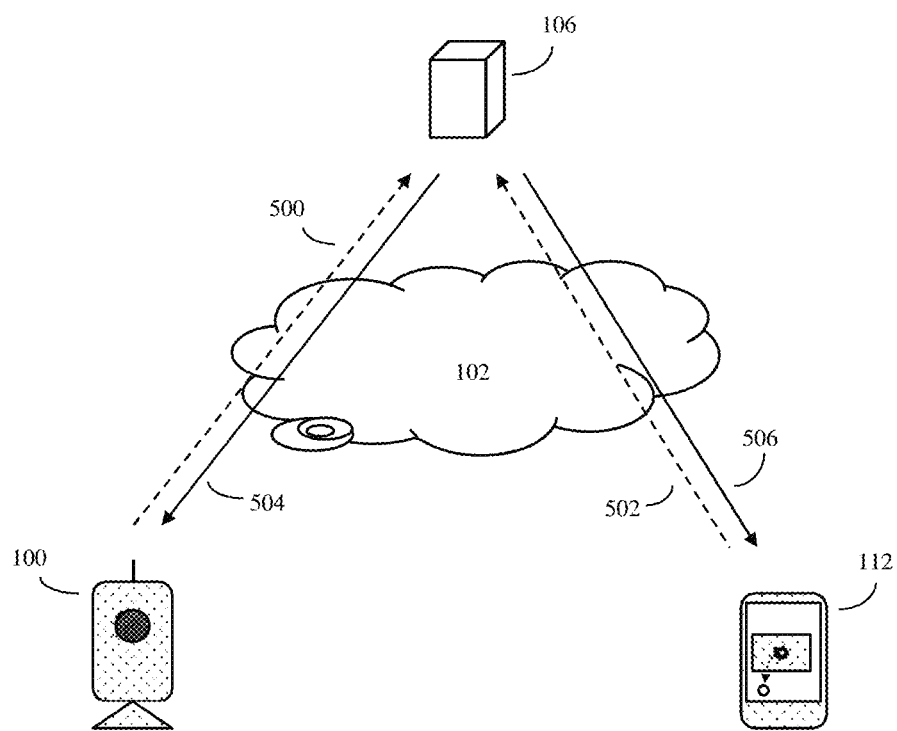
FIG. 5 shows how the processor equipped video camera(s) and/or client computerized device firmware or other type of software may be upgraded.

FIG. 5 shows how processor equipped video camera and/or client computerized device firmware or other software may be upgraded. This firmware is generally the software needed to direct the processors of camera (100) or client computerized device (112) to conduct the inventions methods as described herein. Often this firmware will be stored in memory onboard the camera (100) or client computerized device (112), such as random access memory, flash memory, magnetic disk memory, and the like).

According to these methods, the camera (100) can either automatically manually transmit (500) its current firmware version to the VCS remote Internet server (106), or alternatively it can just transmit a request for a firmware update. Similarly client computerized device (112) can also either automatically or manually transmit (502) its current firmware version to the VCS remote Internet server (106), or alternatively it can just transmit a request for a firmware update. The VCS remote Internet server(s) (106) can respond by transmitting the appropriate latest version of the firmware to the (504) camera (100) or client computerized device (506) (112).

The cloud camera can perform an automatic upgrade once it has been requested by the user. When the camera receives a request to upgrade, it can, for example, use a firmware URL passed to it from the request to download the firmware file. After the download of the firmware file is complete, the upgrade process can begin. Other methods can also be used.

The upgrade process can also be handled in stages to ensure that the camera or client computerized device will be able to recover from any stage of the upgrade process due to any failure. For example, after the download file is complete, the camera processor can confirm if the downloaded file is correct and then reboot the camera into a "safe mode". This safe mode can be a minimal partition that will allow writing to the camera's the kernel or file system to the camera's memory (e.g. Flash, NAND, etc.). After the upgrade has completed, the camera can then reboot back into normal mode for regular operations.

Additionally, in some embodiments, an administration portal (e.g. webpages) can be made available to allow privileged users and system administrators to add, modify, and delete any firmware versions to be pushed to the camera. This allows authorized users to push firmware upgrades various customers and cameras.

Peer-to-Peer Video Streaming

In a preferred embodiment, the system will at least occasionally work according to various streaming methods, such as peer-to-peer video streaming methods. Such peer-to-peer video streaming methods can help decrease the load on the system servers, thus reducing demand on system resources and helping to facilitate system scaling as demand increases.

Here, such streaming methods can be initiated using various initial server handshake and setup messages that can convey data necessary to initiate the video streaming process. Afterwards (assuming that direct P2P connections are possible) the camera can then be configured to stream data directly to the client computerized device. Here, to reduce the load on the servers, the P2P connections to the servers may be disconnected as desired.

If, however, direct P2P connections between the camera and the client computerized device are not possible (e.g. due to problematic firewalls), then the servers may continue to be involved and act as a relay connection as needed.

Put alternatively, in some embodiments, commands from the remote Internet server(s) can be used to further configure the network connected video camera to either stream video data directly to the client computerized device (e.g. using P2P methods), or alternatively to stream video data to the client computerized device via the remote Internet server.

The system can use various peer-to-peer streaming approaches to try to overcome various firewalls and other network impediments. For example, the system may employ real time streaming protocols to help facilitate transport through various firewalls. Additionally, the system may be configured to make multiple attempts to connect the camera and the client directly using techniques such as various network address translation (NAT) traversal techniques, before deciding that direct P2P between the camera and client computerized device is unfeasible (and to therefore fall back to alternative server relay methods).

Various methods of P2P streaming between the camera and the client computerized device include:

1: LOCAL: If the client computerized device and camera are on the same local LAN or WiFi network, the problem is greatly simplified. The two devices can communicate with each other as local LAN/WIFI devices without further need of any traversal methods.

To establish a peer-to-peer (P2P) direct connection, an IP gathering server, such as Traversal Using Relay around NAT (TURN), can be used as a global server with authentication credentials set for security purposes. Both the client computerized device and the camera will gather their respective IP address lists using any mechanism, such as Session Traversal Utilities for NAT (STUN), from this IP allocation server in preparation for direct communication as peers. The client computerized device can then request a stream from a camera through the DMS server, which will relay the list of address candidates between the two peers. The camera and client can then attempt to connect to one another through the list of candidate addresses using a protocol, such as Interactive Connectivity Establishment (ICE), until a direct P2P data channel is opened for communication.

In this mode, the camera and client computerized device are local to the network LAN or WiFi network. The server can request the camera to directly send a video stream (in a format such as RTSP video stream) or Motion JPG sequence of images to the client computerized device. The client computerized device receives this video locally via the appropriate network port, and displays the video data based on the (1) RTSP or (2) M-JPG or a (3) custom exchange format. In the mode, video or image data need not go via Internet relay server or NAT Traversal routes.

2: DIRECT: Peer-to-Peer (P2P) video display DIRECT between camera and the client computerized device, generally using various NAT Traversal methods to overcome firewalls and other network impediments.

In this mode the camera and client computerized device, aided by the server, detects that they are on separate networks separated by firewalls, and thus must attempt to use NAT Traversal techniques to directly communicate with each other. This P2P direct method will attempt to use NAT Traversal methods to try to automatically open the appropriate network port in the firewall or router. If this port is successfully opened, then the video or image or camera data can flow thru the firewall/router and direct communications between the camera and client computerized device can be established. If attempts at direct connection fail, then the system will invoke a next session (below) that will instead attempt to connect through a relay P2P server.

3: RELAY/PROXY: Use an intermediate Internet server to connect/collect/relay/transfer video data between the camera and the client computerized device.

Since a relay connection often requires a constant connection between peers to the same P2P server, a load balancing technique may optionally be used to handle scalability. The master P2P server will be running publically with multiple slave P2P servers in its list. The client will start the address gathering request with the master P2P server, which will respond with the location to one of the slave servers. After re-directing to one of the slave servers, the client will connect to this slave server and gather its address list. The client will then send this candidate address list to the camera, along with the appropriate P2P address, using the DMS server. The camera can then request its candidate client computerized device addresses from the same P2P server.

Figure 6:
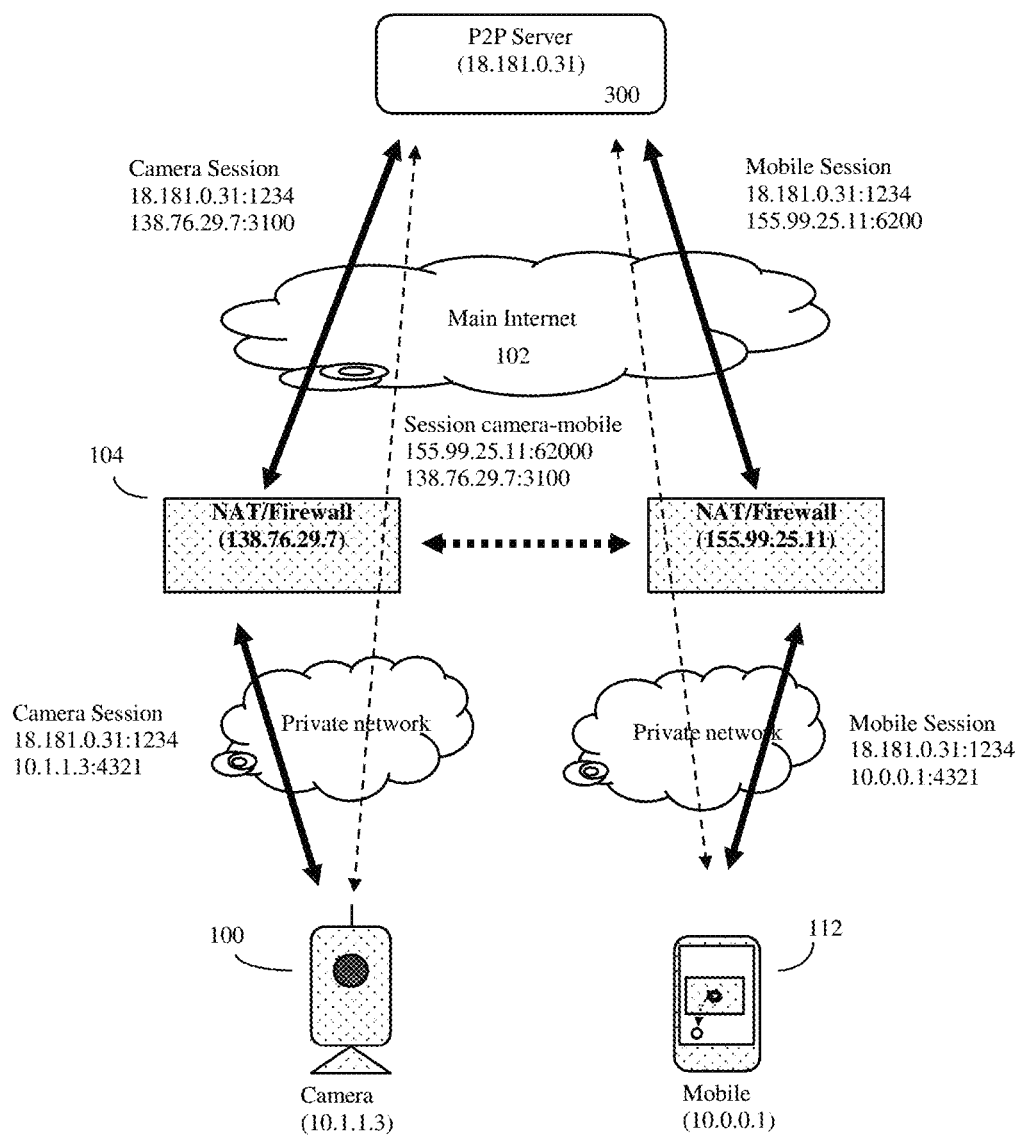
FIG. 6 shows an example of how the system can traverse various firewalls and operate according to various peer-to-peer (P2P) schemes.

FIG. 6 shows an example of how the system can traverse various firewalls and operate according to a peer-to-peer (P2P) scheme. In particular, FIG. 6 shows a specific example of how various IP addresses may be managed.

In general, as previously discussed above, such P2P methods can operate by any of either:
a) Peer-to-Peer (P2P) video display directly between camera (100) and client computerized device (112).
b) RELAY/PROXY: using an intermediate Internet server (e.g. 300) to connect/collect/relay/transfer video data from the camera (100) to the client computerized device (112).
c) LOCAL: The camera (100) and the client computerized device (112) are both on a local LAN or WiFi network. Hence the devices can communicate directly with each other, and the client computerized device(s) (112) can communicate with the camera (100) as a local LAN/WIFI device without need of any additional firewall NAT traversal methods.

Scalability

The VCS architecture is horizontally scalable—allowing it to serve millions of cameras transparently. The architecture is captured in FIG. 7 below.

Figure 7:
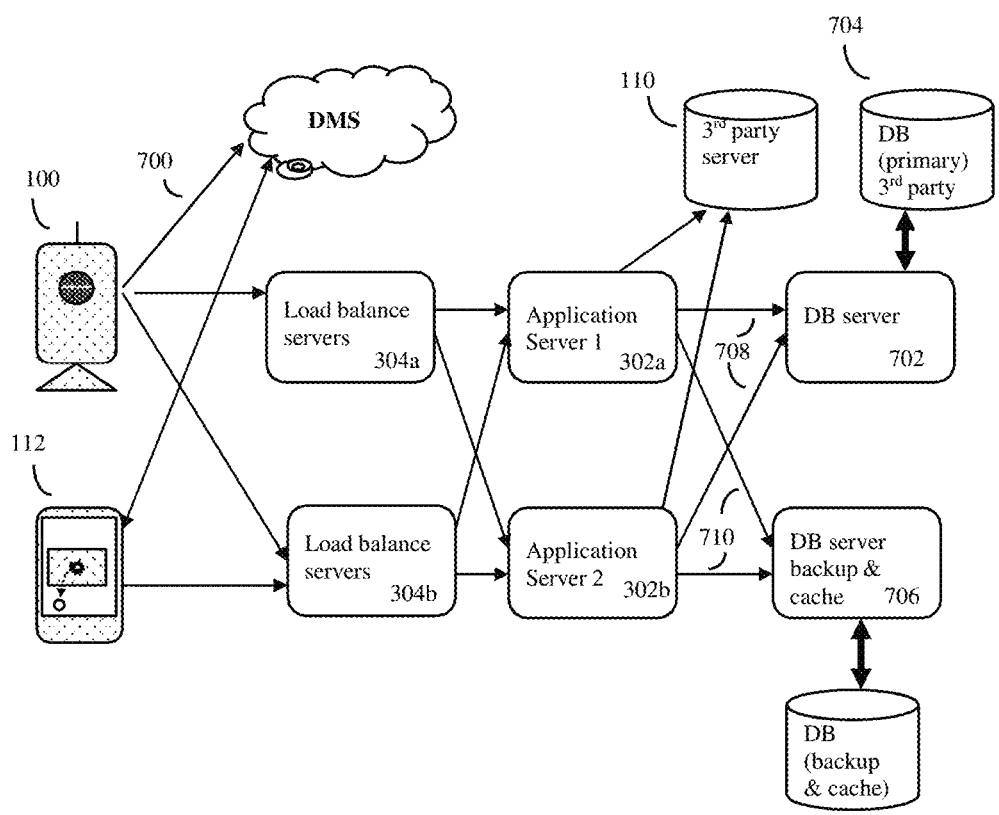
FIG. 7 shows an example of the horizontal scalability of the VCS architecture.

FIG. 7 shows an example of the horizontal scalability of the VCS architecture. In FIG. 7, the video camera, after it is initially configured, can transmit periodic "heartbeat" camera status messages to the DMS system (700). Application servers (302a), (302b) can be configured to be horizontally scalable. Here, for example, more servers may be dynamically provisioned as the load on the servers increases; here use of various scalable "third party" servers, such as the Amazon Elastic Compute Cloud (EC2) servers can be useful.

Similarly the load balance servers (302a), (302b) can be third party load balance servers such as Amazon elastic load balancing servers (ELB), and the like. Video data produced by the system may be stored in various third party servers (110) as well, and use of the previously discussed Amazon Simple Storage Service (S3) may be useful for these purposes. Similarly the database server (702) may be implemented on third party servers such as Amazon Elastic Compute Cloud (EC2) servers as well, and some databases such as the primary database (704) may be implemented using the Amazon elastic block store (EBS) and the like. The DB server backup and cache functionality may be implemented on various third party servers using the previously discussed Amazon Elastic Compute Cloud (EC2) servers or equivalent methods.

Thus in this embodiment, application server (302a) database requests (708) are handled by the database server (702), while cache requests (710) are handled by the database server backup and cache (706).

According to this scheme, assume that the client computerized device is a smartphone or tablet computerized device configured to run the invention's client based software in the form of an app. Thus in operation, the camera (100) sends "heartbeat" camera status messages to the system. Here assume that the camera is also configured to provide a live view of the real-world environment monitored by camera (100). If the system detects an event, the server can send an alert to the app. The app can then request live streaming video (or recorded video) or other data, and these requests can be load balanced to the two or more app servers (302a) and (302b). To scale the system, database (706) and other servers and cloud components may be automatically replicated asynchronously by the Amazon cloud services as needed.

Figure 8:
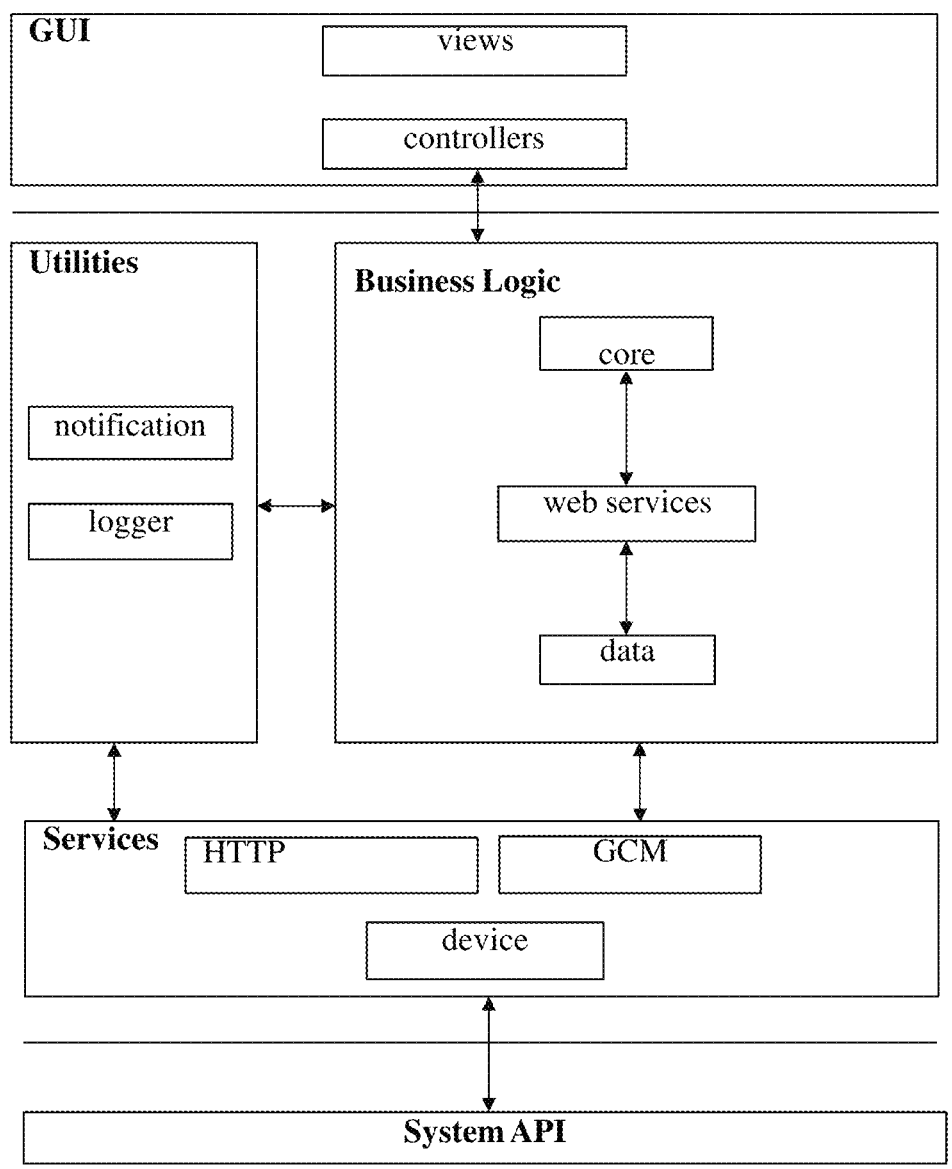
FIG. 8 shows a block diagram of the software structure of the client computerized device.

FIG. 8 shows a block diagram of one possible software structure for the client computerized device (112). Here, the GUI module controls display (114), and the various utility and business logic according to the system, as well as various device services, in turn can be served via various operating systems' API.

Here the client computerized device receives a notification from the system servers which will typically include the eventID (event identification number). In some embodiments, the system can then automatically use this event ID to then construct a reasonably secure URL from which do then obtain the video that corresponds to this eventID.

In addition, as previously discussed, the cloud servers can also search and retrieve videos stored on the various cloud servers, often in the form of URLs for data (such as videos) pertaining to the events that match the provided search criteria. Given that the events can store arbitrary metadata, the search criteria can also be arbitrary. The client computerized device can then view the videos, mark them for further storage, delete the videos, and so on.

Other Embodiments of the System May Additionally be Configured for:

Multiple client operation: Here the system can be configured to accept and host multiple clients (typically using multiple client computerized devices) to use and operate the system, as well as to watch the video data via the system's various Internet servers. Here, for example, Video data may be relayed or passed thru the Internet servers as previously described. This embodiment can also enable one or more clients to receive information pertaining to camera status/ condition or real world event notification.

FIG. 11 shows a method flow diagram depicting the steps in increasing scalability and improving through-put of camera provisioning and event recognition. Servers used for video storage need not be the same as the servers used for video retrieval. For example, different video retrieval servers may draw upon the same video storage servers, or conversely different video storage servers may feed the same video retrieval servers. Separating the two functions allows for improved scalability and throughput. Note also that in some cases, use of video retrieval servers may even be optional. As shown, in step 1, the method starts with detecting a threshold-grade event from audio-video data of a real-world environment captured from a processor-controlled video camera by an event management system applying event detection parameters 1110; step 2 involves storing at least any one of a single stream of the recognized event in at least a first cloud-based server and retrieve the at least any one of the single stream from the at least first cloud-based server by at least one different retrieval dedicated cloud-based server 1120; and finally, step 3, entails facilitating at least one of a user defined playback of the retrieved single stream of the recognized event, user defined playback of the audio-video sequence succeeding and, or preceding the recognized event, and, or remote provisioning of the processor-controlled video camera, whereby the playback and, or provisioning is facilitated via a client device user interface 1130.

Figure 12:
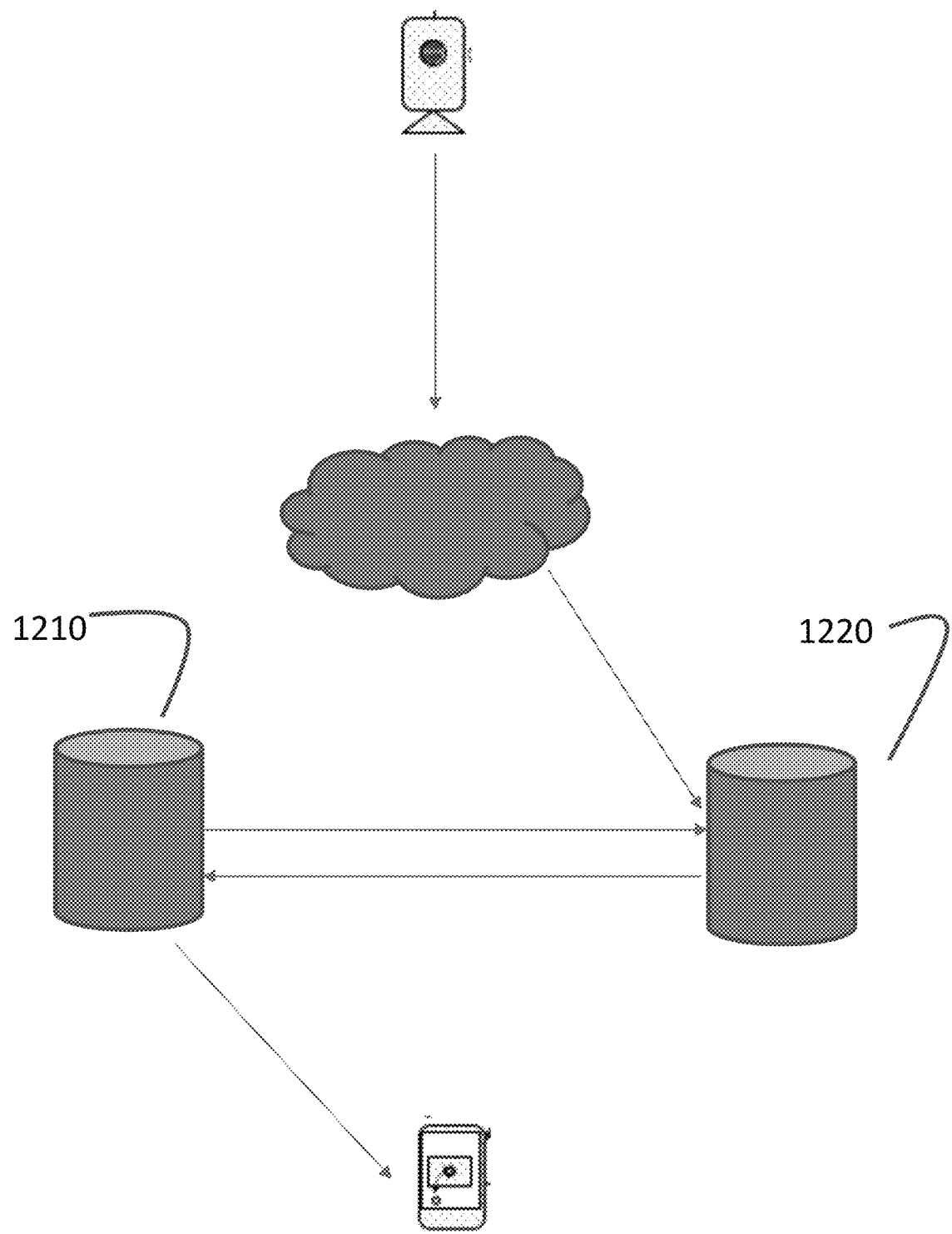
FIG. 12 shows a high-level schematic depicting the cloud-based segregated video storage and retrieval system in accordance with an aspect of the invention.

FIG. 12 shows a high-level schematic depicting the cloud-based storage and retrieval system in accordance with an aspect of the invention. As shown is a system for a cloud-based segregated video storage and retrieval for improved scalability and throughput via at least one processor-controlled video camera and at least one client device. In a preferred embodiment, the system comprises a processor; a processor controlled video camera; a client device in communication with the processor controlled video camera; a non-transitory storage medium coupled to the processor; encoded instructions stored in the non-transitory storage medium, which when executed by the processor, cause the processor to: detect a threshold-grade event from audio-video data of a real-world environment captured from the processor-controlled video camera by an event detection module within an event management system applying event detection parameters.

Preferably, the event recognition module may analyze the threshold-grade event for categorization into any one of a recognized event by an event recognition module within the event management system applying event recognition parameters; store at least any one of a single stream of the recognized event in at least a first cloud-based server 1220 and retrieve the at least any one of the single stream from the at least first cloud-based server 1220 by at least one different retrieval dedicated cloud-based server 1210; and facilitate at least one of a user defined playback of the retrieved single stream of the recognized event, user defined playback of the audio-video sequence succeeding and, or preceding the recognized event, and, or remote provisioning of the processor-controlled video camera, whereby the playback and, or provisioning is facilitated via a client device user interface.

Shared users: Here the system may be configured to enable a remote user client to share the camera operations, live video, or camera notifications or camera settings with either other users or with various client designated social networks.

Manual triggered recording: In this embodiment, the system may be configured to enable a user to manually initiate recording, and allow the user to manually designate that video for certain recording times and durations then be automatically saved. This option is called "manual recording" or "manual image capture—on demand". The manually triggered data may then be saved is saved in the cloud or on the user's client computerized devices as per the other data (previously discussed).

PTZ (Pan-Tilt-Zoom) camera operation: In this embodiment, the system may be configured to enable the user to move the camera manually to adjust and/or point to a particular scene/location. Here the system software and camera hardware configuration is configured to allow the camera to pan, tilt, and zoom via remote commands, often from the client computerized device. In some cases the camera may also be configured with the ability to move automatically and automatically follow a particular moving object.

Capability to adjust video bandwidth/bitrate or data rate: In this embodiment, either automatically (e.g. depending on the capability of the network or associated hardware) or manually, the camera can be configured to adjust the bitrate or video size/data rate or bandwidth of the transmitted video data to be sent out. In general, of course, the greater the bitrate, the better the video signal, but if a given camera site or user computerized device has limited bandwidth, then the system (using manual commands as desired) can adjust the bitrate or bandwidth of the transmitted video. Often this will be done automatically using various adaptive (automatic) bandwidth adjustment schemes.

Push to talk capability: In some embodiments, the system may be configured to work with cameras that are equipped with both microphones and speakers. When such local microphones and speakers are available, then the system may be configured to enable clients to audio communicate with other entities (humans, animals, audio responsive equipment) using the client's client computerized devices. Here for example, a remote client user might use his mobile phone (type client computerized device to talk to a person in front of the camera. The audio message can be sent via the Internet connection and the Internet servers, and played by the camera's speaker. Thus, depending on the equipment and the configuration, either two-way audio communication, or one-way audio communication, may be achieved.

Advanced video analytics: In addition to the various automated video event detection schemes previously discussed, the system, at either the local camera level, or alternatively at the Internet server level, can be configured to also perform more advanced video analytics. This more advanced video analytics can also be used either detect events or analyze events. This more advanced video analytics can include: human face detection or even recognition of individual human faces, vehicle or license plate detection and recognition, movement or location in particular designated areas or zones (useful for intrusion detection, such as when someone crosses a line or perimeter, or loiters or waits in a particular zone for a preset "excessive time" period of time). The system can also be set to recognize and/or generate events when an object is found to be moving at a higher rate of speed that exceeds a preset "excessive speed" value.

Advanced audio analytics: In addition to the various automated audio event detection schemes previously discussed, the system, at either the local camera level, or alternatively at the Internet server level, can also be configured to perform more advanced audio analytics as well. This more advanced audio analytics can include: breaking glass sound detection, shouting or screaming sound detection, gunshot sound detection, barking dog sound detection, door opening or closing sound detection, infant crying sound detection, and the like.

As illustrated in FIGS. 9 and 10, the event detection module 930*b*, 1040*a* of the event management system 1040 detects a threshold-grade event based on at least one of a pre-defined, user-defined, and, or learned threshold of any one of computed pixel values derived from any one of a parameter. As previously described, the parameters may be at least one of object detection, scene change, object left or removed, line crossing, movement, count, shape, and, or sound change. Furthermore, the event recognition module 930*b*, 1040*a* of the event management system 1040 analyzes at least one of computed pixel values derived from at least one of a parameter from a threshold-grade event by referencing against at least one of a pre-defined, user-defined, and, or learned reference table of recognized event-computed pixel values.

In furtherance of the event recognition process flow, the event recognition module 930c, 1040b may query an event recognized database and retrieve any one of a matched recognized event based on at least one of a pixel value, analysis of pixel value, metadata and, or hash map from an event bucket in the event recognized database.

Furthermore, the event recognition module 930c, 1040b may be configured to run an analysis algorithm for movement tracking and, or movement extrapolating over an array of incoming image frames. Moreover, the event recognition module 930c, 1040b may query the event recognized database and retrieve any one of a matched recognized event based on movement data from the event bucket in the event recognized database. The event recognition module 930c, 1040b may be further configured to: determine the content of a threshold-grade event based on determining at least one object identity by matching any one of at least scene change, movement, count, shape, sound, metadata, and, or hashmap characteristics of the object with objects in an event bucket in the event recognized database.

Alternatively, a look-up routine triggered by pixel value(s) and not by defined parameters may be employed by the event recognition module 930c, 1040b. The event recognized by the event recognition module 930c, 1040b may be at least one of face recognition, object recognition, movement, intrusion, location in designated areas, loitering, vehicle/license plate recognition, impact, and, or aberrant sound.

In some embodiments, the event detection module 930b, 1040a and, or event recognition module 930c, 1040b may employ machine learning to update any one of a threshold of computed pixel values for event detection and, or update any one of a reference analysis of computed pixel values for event recognition. Examples of machine learning may be at least one of a convolution neural network, associated model, training data set, feed-forward neural network, and, or back-propagated neural network.

External triggers: In some embodiments, the system may also be configured to respond to external triggers. These external triggers are often events that may not have been detected by the camera per se, but instead may have been detected by other sensors or devices. Here input from these other sensors or devices, ideally packaged in a manner that allows the system to determine which cameras may be closest to the external trigger event, can be transmitted to the system servers and both used to notify clients via their client computerized devices, and/or used to activate the camera and store any camera data in the context of this external trigger.

Play sound or audio output upon events: In some embodiments, the system may also be configured to automatically play sounds or audio clips on event detection. These sounds or audio clips may either be played locally to the event (e.g. on a speaker associated with a camera that is detecting and recording the event) or alternatively remote from the event, such as on a remote client computerized device.

Therefore, the foregoing is considered as illustrative only of the principles of the invention. Further, since numerous modifications and changes will readily be apparent to those skilled in the art, all suitable modifications and equivalents may be considered as falling within the scope of the invention.

The invention claimed is:

1. A computing apparatus comprising:
   a processor; and
   a memory storing instructions that, when executed by the processor, configure the apparatus to perform operations comprising:
   determining a computed pixel value from a zone of an event-detected image frame captured from a video camera;
   referencing the zone-specific value against a pre-defined reference table of event-recognized computed pixel values;
   detecting a threshold-grade event based on the referencing;
   categorizing the threshold-grade event into any one of a recognized event based on the referencing;
   storing a single stream of the recognized event in a single cloud-based server and feeding the single stream from the single cloud-based server to a retrieval cloud-based server;
   overlaying a contextual data comprising information of the recognized event on the single stream of the recognized event; and
   transmitting a status message indicating that the video camera is operating improperly, in response to determining that the video camera is operating improperly.

2. The computing apparatus of claim 1, wherein the operations comprise:
   facilitating a user-defined playback of the retrieved single stream of the recognized event, user-defined playback of the audio-video sequence succeeding and, or preceding the recognized event, and, or remote provisioning of the video camera, whereby the playback and, or provisioning is facilitated via a client device user interface.

3. The computing apparatus of claim 1, wherein detecting the threshold-grade event comprises:
   detecting the threshold-grade event from audio-video data of a real-world environment captured from the video camera by an event management system applying event detection parameters based on the referencing.

4. The computing apparatus of claim 3, wherein the event management system comprises at least one of device management services, user management services, or alert management services.

5. The computing apparatus of claim 3, wherein the event management system detects the threshold-grade event based on at least one of a pre-defined, user-defined, and, or learned threshold of any one of computed pixel values derived from any one of a parameter.

6. The computing apparatus of claim 5, wherein the parameter is at least one of object detection, scene change, object left or removed, line crossing, movement, count, shape, and, or sound change.

7. The computing apparatus of claim 1, wherein the categorizing the threshold-grade event comprises:
   analyzing the threshold-grade event for categorization into any one of a recognized event by an event management system applying event recognition parameters based on the referencing.

8. The computing apparatus of claim 7, wherein the event management system analyzes at least one of computed pixel values derived from at least one of a parameter from the threshold-grade event by referencing against at least one of a pre-defined, user-defined, and, or learned reference table of recognized event-computed pixel values.

9. The computing apparatus of claim 1, wherein the recognized event is at least one of face recognition, object recognition, movement, intrusion, location in designated areas, loitering, vehicle/license plate recognition, impact, and, or aberrant sound.

10. The computing apparatus of claim 7, wherein the event management system queries an event recognized database;
retrieves any one of a matched recognized event based on at least one of a pixel value, analysis of pixel value, metadata and, or hash map from an event bucket in the event recognized database.

11. The computing apparatus of claim 7, wherein the event management system is configured to run an analysis algorithm for movement tracking and, or movement extrapolating over an array of incoming image frames; and the event management system queries the event recognized database and retrieves any one of a matched recognized event based on movement data from the event bucket in the event recognized database.

12. The computing apparatus of claim 7, wherein the event management system is configured to: determine the content of the threshold-grade event based on determining at least one object identity by matching any one of at least scene change, movement, count, shape, sound, metadata, and, or hashmap characteristics of the object with objects in an event bucket in the event recognized database.

13. The computing apparatus of claim 1, wherein the operations comprise:
employing machine learning to update any one of a threshold of computed pixel values for event detection and, or update any one of a reference analysis of computed pixel values for event recognition.

14. The computing apparatus of claim 13, wherein the machine learning is at least one of a convolution neural network, associated model, training data set, feed-forward neural network, and, or back-propagated neural network.

15. The computing apparatus of claim 3, wherein the event management system is configured to perform at least one of an audio, video, and, or image frame upload, save, retrieval, and, or playback in a staged-event driven manner (SEDA), wherein at least one of an upload, save, retrieval, and, or playback is via a serial of audio-video-image segments over a time frame comprising a detected and, or recognized event.

16. A method comprising:
determining a computed pixel value from a zone of an event-detected image frame captured from a video camera;
referencing the zone-specific value against a pre-defined reference table of event-recognized computed pixel values;
detecting a threshold-grade event based on the referencing;
categorizing the threshold-grade event into any one of a recognized event based on the referencing;
storing a single stream of the recognized event in a single cloud-based server and feeding the single stream from the single cloud-based server to a retrieval cloud-based server;
overlaying a contextual data comprising information of the recognized event on the single stream of the recognized event; and
transmitting a status message indicating that the video camera is operating improperly, in response to determining that the video camera is operating improperly.

17. The method of claim 16, further comprising:
facilitating a user-defined playback of the retrieved single stream of the recognized event, user-defined playback of the audio-video sequence succeeding and, or preceding the recognized event, and, or remote provisioning of the video camera, whereby the playback and, or provisioning is facilitated via a client device user interface.

18. The method of claim 16, wherein detecting the threshold-grade event comprise:
detecting the threshold-grade event from audio-video data of a real-world environment captured from the video camera by an event management system applying event detection parameters based on the referencing.

19. The method of claim 18, wherein the event management system detects the threshold-grade event based on at least one of a pre-defined, user-defined, and, or learned threshold of any one of computed pixel values derived from any one of a parameter.

20. A non-transitory computer-readable storage medium, the computer-readable storage medium including instructions that when executed by a computer, cause the computer to:
determining a computed pixel value from a zone of an event-detected image frame captured from a video camera;
referencing the zone-specific value against a pre-defined reference table of event-recognized computed pixel values;
detecting a threshold-grade event based on the referencing;
categorizing the threshold-grade event into any one of a recognized event based on the referencing;
storing a single stream of the recognized event in a single cloud-based server and feeding the single stream from the single cloud-based server to a retrieval cloud-based server;
overlaying a contextual data comprising information of the recognized event on the single stream of the recognized event; and
transmitting a status message indicating that the video camera is operating improperly, in response to determining that the video camera is operating improperly.

* * * * *